United States Patent
Ejima et al.

(10) Patent No.: US 8,605,162 B2
(45) Date of Patent: Dec. 10, 2013

(54) DIGITAL CAMERA HAVING VIDEO FILE CREATING FUNCTION

(75) Inventors: Satoshi Ejima, Toyko (JP); Akira Ohmura, Toyko (JP)

(73) Assignee: Nikon Corporation, Tokyo (JP)

( * ) Notice: Subject to any disclaimer, the term of this patent is extended or adjusted under 35 U.S.C. 154(b) by 300 days.

(21) Appl. No.: 12/923,965

(22) Filed: Oct. 18, 2010

(65) Prior Publication Data

US 2011/0063463 A1    Mar. 17, 2011

Related U.S. Application Data

(63) Continuation of application No. 11/286,287, filed on Nov. 25, 2005, now abandoned.

(30) Foreign Application Priority Data

| Dec. 3, 2004 | (JP) | ................................. 2004-351267 |
| Dec. 3, 2004 | (JP) | ................................. 2004-351268 |
| Dec. 3, 2004 | (JP) | ................................. 2004-351269 |
| Dec. 3, 2004 | (JP) | ................................. 2004-351270 |

(51) Int. Cl.
*H04N 5/225*    (2006.01)

(52) U.S. Cl.
USPC .................................................... 348/220.1

(58) Field of Classification Search
USPC ........... 348/207.99, 220.1, 221.1, 14.14, 362, 348/222.1
See application file for complete search history.

(56) References Cited

U.S. PATENT DOCUMENTS

| 4,660,102 | A |   | 4/1987 | Kawakami et al. |
| 4,837,628 | A |   | 6/1989 | Sasaki |
| 5,034,888 | A |   | 7/1991 | Uehara et al. |
| 5,444,482 | A |   | 8/1995 | Misawa et al. |
| 5,900,909 | A | * | 5/1999 | Parulski et al. ............ 348/231.6 |
| 6,034,728 | A |   | 3/2000 | Arena |
| 6,038,257 | A | * | 3/2000 | Brusewitz et al. ....... 375/240.21 |
| 6,687,515 | B1 |   | 2/2004 | Kosaka |
| 6,778,760 | B1 |   | 8/2004 | Kagle |
| 7,199,823 | B2 | * | 4/2007 | Masuyama ................. 348/229.1 |
| 7,257,317 | B2 | * | 8/2007 | Ohnishi ........................ 386/230 |
| 7,321,719 | B2 |   | 1/2008 | Kagle |
| 2001/0036231 | A1 |   | 11/2001 | Easwar et al. |
| 2002/0196348 | A1 |   | 12/2002 | Kubo |
| 2002/0197067 | A1 | * | 12/2002 | Ohnishi ........................ 386/120 |

FOREIGN PATENT DOCUMENTS

| JP | A-63-009290 | 1/1988 |
| JP | A-63-189090 | 8/1988 |
| JP | A-2-177073 | 7/1990 |
| JP | A-4-368925 | 12/1992 |
| JP | A-5-336488 | 12/1993 |

(Continued)

OTHER PUBLICATIONS

Notice of Reasons for Refusal for Japanese Patent Application No. 2004-351269 dated Oct. 16, 2009.

*Primary Examiner* — James M Hannett
*Assistant Examiner* — Ahmed A Berhan
(74) *Attorney, Agent, or Firm* — Oliff & Berridge, PLC

(57) ABSTRACT

A digital camera includes an image capturing unit, an image capturing control unit, and an image processing unit. The image capturing control unit controls the image capturing unit so as to obtain a still image. The image processing unit creates freeze video data used for reproducing the still image for a predetermined period of time.

14 Claims, 15 Drawing Sheets

(56) References Cited

FOREIGN PATENT DOCUMENTS

| | | |
|---|---|---|
| JP | A-06339098 | 6/1994 |
| JP | A-08186747 | 7/1996 |
| JP | A-8-275137 | 10/1996 |
| JP | A-10070697 | 3/1998 |
| JP | A-2000-138941 | 5/2000 |
| JP | A-2001-078137 | 3/2001 |
| JP | A-2001-111992 | 4/2001 |
| JP | A-2001-202695 | 7/2001 |
| JP | 2002084442 A * | 3/2002 |
| JP | A-2002-84442 | 3/2002 |
| JP | A-2002-101331 | 4/2002 |
| JP | A-2002-300445 | 10/2002 |
| JP | A-2003-008948 | 1/2003 |
| JP | A-2004-186866 | 7/2004 |
| JP | A-2004-207805 | 7/2004 |
| JP | A-2004-248171 | 9/2004 |
| JP | A-2004-297177 | 10/2004 |
| WO | WO 01/67747 A1 | 9/2001 |

* cited by examiner

FIG. 3
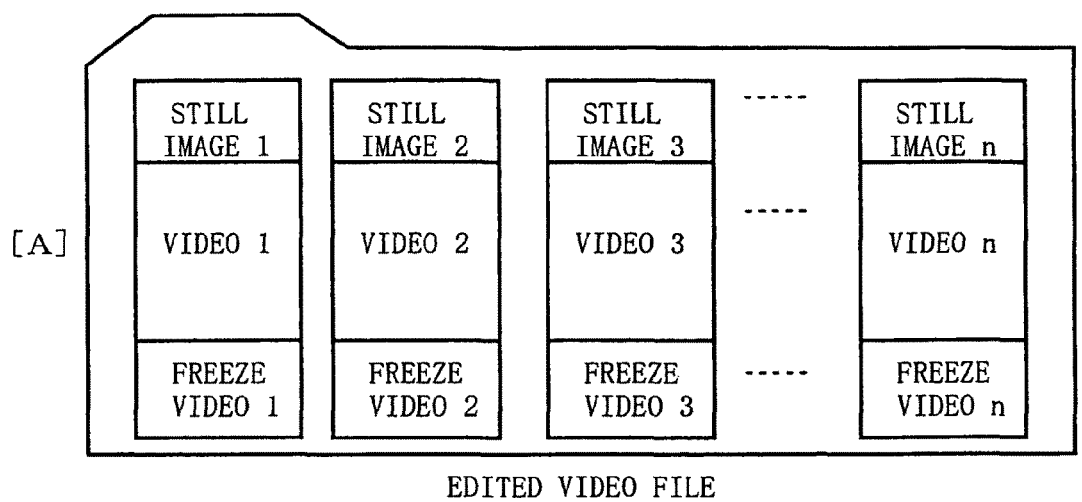
EDITED VIDEO FILE
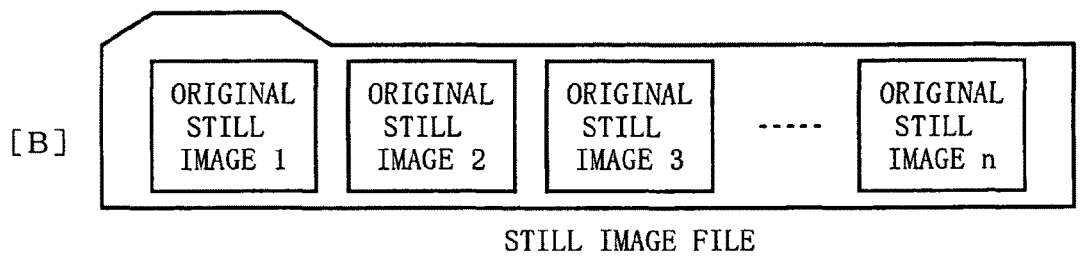
STILL IMAGE FILE

ONE UNIFIED VIDEO FILE

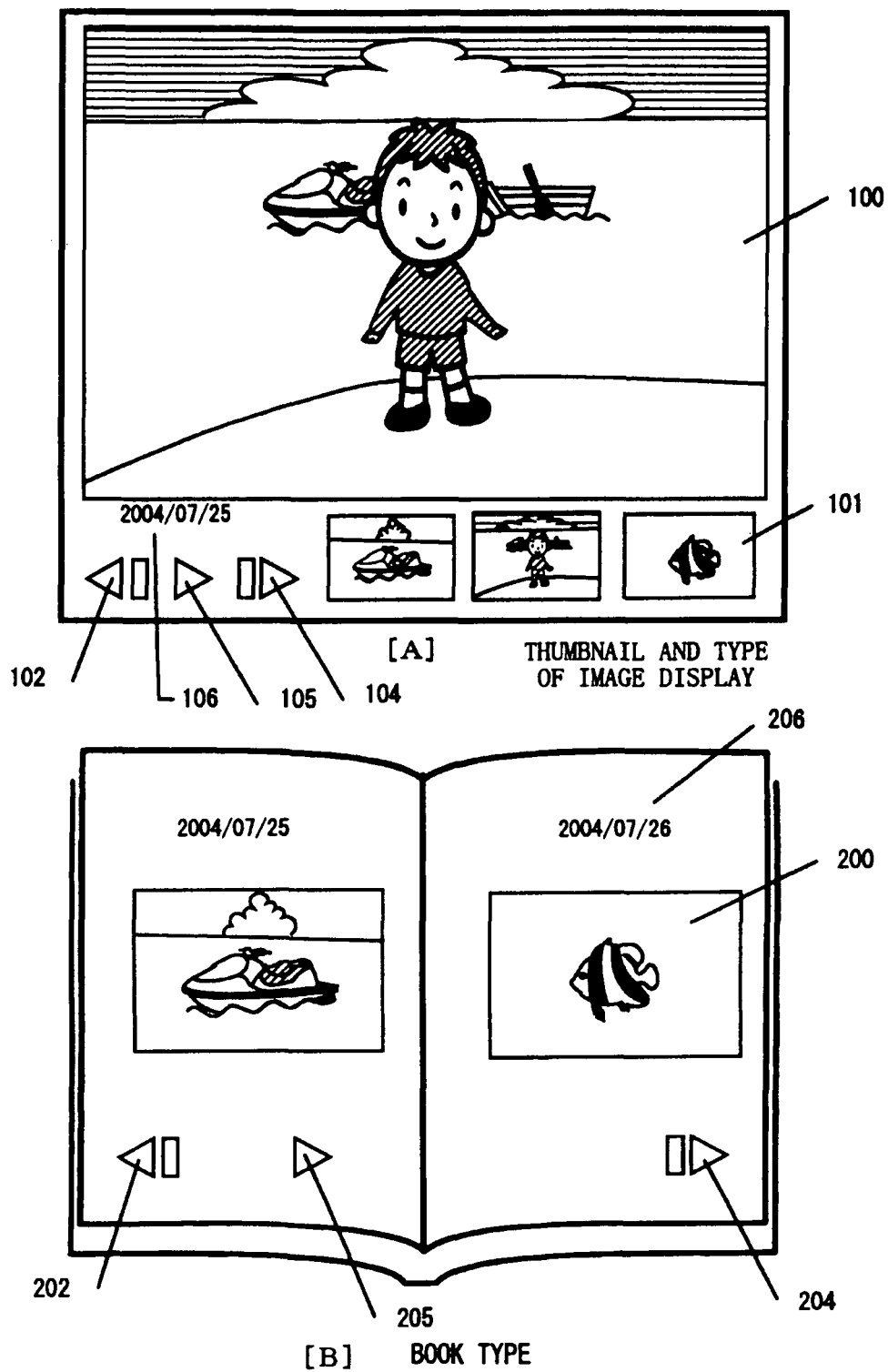

DIGITAL CAMERA HAVING VIDEO FILE CREATING FUNCTION

CROSS REFERENCE TO RELATED APPLICATION

This application is a Continuation of application Ser. No. 11/286,287 filed Nov. 25, 2005 and is based upon and claims the benefit of priority from Japanese Patent Application Nos. 2004-351267, 2004-351268, 2004-351269, and 2004-351270, all filed on Dec. 3, 2004, the entire contents of which are incorporated herein by reference.

BACKGROUND OF THE INVENTION

1. Field of the Invention

The present invention relates to a digital camera having video file creating function.

2. Description of the Related Art

With a widespread use of a digital camera in recent years, a still image file is easily creatable. Such a still image file can be reproduced and displayed on a computer by using a viewer program. Also, video-software-dedicated reproduction devices such as a DVD player have recently come into wide use at home, so that the a large number of people can enjoy video software easily on a television at home.

However, such video reproduction devices specialize in a video software reproduction, and many of them do not have a function of reproducing a still image file. For this reason, it has been difficult to easily reproduce a still image file created in the digital camera and view the still image on the home television.

Japanese Unexamined Patent Application Publication No. 2002-300445 discloses a digital camera in which a video shooting operation and a still image shooting operation can be easily switched over. That is, the digital camera disclosed therein starts shooting the video upon half press to a release button. The digital camera stops shooting the video in response to a release from the half press of the release button and then stores a video file in a recording medium. On the other hand, upon a change from the half pressing to a full pressing, the digital camera stops shooting the video and simultaneously starts shooting the still image. At this time, in the digital camera, both of a video file and a still image file are created and stored in the recording medium. A link file between both the files is also stored in the recording medium. The digital camera disclosed in the document analyzes data of the link file by using a dedicated reproduction device, and reproduce related video and still image files sequentially. However, a general-purpose reproduction device does not have a function of analyzing the data of the link file disclosed in the document. Therefore, the still image files created by the digital camera disclosed in the document cannot be reproduced by the widespread household video reproduction device.

Further, the digital camera disclosed in Japanese Unexamined Patent Application Publication No. 2002-300445 has operational problems. In general, before starting shooting the still image, a user often presses the release button halfway several times repeatedly for composition adjustment or focus adjustment. Upon every half press operation, the video file is stored in the digital camera. In other words, many unwanted video files for the user may be stored therein. In addition, if the release button is fully pressed at once, a momentary half press state may occur, which may cause generation and storage of very short, useless video files. Further, the user tends to pan a camera for the composition adjustment while halfway pressing the release button. During the panning, the screen moves largely, so that the screen blurs a lot. This may cause storage of undesirable video files.

Furthermore, there is a known technique for reproducing a video file shot in a vertical position disclosed in Japanese Unexamined Patent Application Publication No. 2004-248171. According to this document, at the video reproduction, the video is rotated to the vertical position for display. As described therein, a conventional digital camera records the video which is shot in the vertical position without rotating the image.

SUMMARY OF THE INVENTION

Hereinafter, the invention will be described.

(1) A digital camera according to an aspect of the invention includes an image capturing unit, an image capturing control unit, and an image processing unit. The image capturing unit captures an image of a photographic subject. The image capturing control unit controls the image capturing unit to obtain a still image. The image processing unit creates freeze video data used for reproducing the still image for a predetermined period of time.

(2) According to the invention, preferably, the image processing unit creates the freeze video data used for reproducing the still image for the predetermined period of time, in a data format compliant with a predetermined video file specification.

(3) According to the invention, preferably, the digital camera further includes a sound collecting unit and a sound processing unit. The sound collecting unit collects a sound to create sound data. The sound processing unit acquires, from the sound collecting unit, sound data during a period of time including a point of time when the still image is captured, and then adds the sound data to the freeze video data so that the sound data is reproducible in synchronization with the freeze video data.

(4) Furthermore, preferably, the image capturing control unit controls the image capturing unit to create video data before the still image is captured. The image processing unit creates a video file in which the video data and the freeze video data are connected in reproduction order.

(5) Furthermore, according to the invention, preferably, the image capturing control unit controls the image capturing unit to create video data after the still image is captured. The image processing unit creates a video file in which the video data and the freeze video data are connected in reproduction order.

(6) Furthermore, according to the invention, preferably, the digital camera further includes a sound effect processing unit. The sound effect processing unit adds predetermined sound effect data to the video file such that the predetermined sound effect data is reproducible in synchronization with a time when freeze video data reproduction and video data reproduction are switched.

(7) Preferably, the digital camera further includes an effective image processing unit. The effective image processing unit adds to the video file a predetermined effective image to be inserted when the freeze video data reproduction and the video data reproduction are switched. The predetermined effective image effectively shows that the switching between the free video data reproduction and the video data reproduction is done.

(8) Furthermore, preferably, the image capturing control unit creates the video data by reading pixels with a low resolution from the image capturing unit. Also, the image capturing control unit converts a resolution of the still image obtained through a high resolution reading from the image capturing unit, so as to create the freeze video data whose number of pixels match with that of the video data.

(9) Furthermore, preferably, the image capturing control unit increases, by a pixel interpolation, the number of pixels of the video data which is read with a low resolution from the image capturing unit. In addition, the image capturing control unit converts a resolution of the still image obtained through a high resolution reading from the image capturing unit, so as to create the freeze video data whose number of pixels matches with that of the video data.

(10) Furthermore, preferably, the digital camera further includes a position determination unit and a rotational conversion unit. The position determination unit determines in which shooting position, vertical or horizontal, an image is shot. The rotational conversion unit rotationally converts the still image according to the shooting position. The image processing unit stores the rotationally converted still image in a video frame, thereby creating freeze video data used for reproducing the rotationally converted still image for a predetermined period of time.

(11) Furthermore, preferably, when rotationally converting the still image, the rotational conversion unit converts the resolution of the still image such that the number of pixels of the still image on a long side of a frame is smaller than that of the still image on a short side thereof.

(12) Furthermore, preferably, when rotationally converting the still image, the rotational conversion unit adds a predetermined image for aspect adjustment outside a frame of the rotationally converted still image so as to maintain an aspect ratio before the rotational conversion.

(13) Furthermore, preferably, the image processing unit connects a plurality of pieces of freeze video data to create a video file which is usable for an automatic slide reproduction.

(14) Furthermore, preferably, the image processing unit creates from a still image an image to be displayed for one of options to reproduce, and stores the created image in the video file for a chapter menu.

(15) Furthermore, preferably, the image processing unit creates, from a still image with a different shooting date from that of an immediately preceding still image, an image to be displayed for one of options to reproduce, and stores the created image in the video file for a chapter menu.

(16) Furthermore, preferably, when the plurality of pieces of freeze video data to connect have different shooting dates, the image processing unit inserts a shooting date to a portion at which the dates of the freeze video data change at reproduction.

(17) Furthermore, preferably, the image processing unit stores in the video file identification information specifying a still image file from which the image to be displayed is created.

(18) A second digital camera according to another aspect of the invention is capable of shooting both a video and a still image and includes a first control unit and a second control unit. The first control unit starts buffering a video upon an input of a first start signal, and releases the video being buffered without storing it upon the cancellation of the first start signal. The second control unit shoots and stores a still image upon an input of a second start signal, and stores the video being buffered in synchronization with the second start signal.

(19) Further, preferably, the second digital camera further includes a release operating member. The release operating member has two-step switch of a half press and a full press. In addition, the release operating member outputs the first start signal in response to the half press and cancels the first start signal in response to a release of the half press. Moreover, the release operating member outputs the second start signal in response to the full press. The first control unit starts buffering a video in response to the half press and releases the video being buffered without storing it in response to a release of the half press. The second control unit shoots and stores a still image in response to the full press and stores the video being buffered in synchronization with the full press.

(20) Furthermore, preferably, the second digital camera further includes a framing determination unit. The framing determination unit outputs the first start signal when detecting that a framing of the digital camera is in a stable state. In addition, the framing determination unit cancels the first start signal when detecting that the framing thereof is in an unstable state. On the other hand, the first control unit starts buffering a video in response to a detection that the framing is in the stable state and releases the video being buffered without storing it when detecting that the framing is in the unstable state.

(21) Furthermore, preferably, the second digital camera further includes a self-timer unit. The self-timer unit outputs the first start signal in response to a start of a self-timer and cancels the first start signal in response to a cancellation of the self-timer. In addition, the self-timer unit outputs the second start signal in response to the time elapse of the self-timer. On the other hand, the first control unit starts buffering a video in response to a start of the self-timer and releases the video being buffered without storing it in response to a cancellation of the self-timer. The second control unit shoots and stores a still image in response to the time elapse of the self-timer and stores the video being buffered in synchronization with the time elapse.

(22) Furthermore, preferably, the second digital camera further includes a period determination unit. The period determination unit determines a transition period of time according to a threshold value and does not store the video when the transition period of time is less than the threshold value. The transition period of time is a time from when the first start signal is input to when the second start signal is input.

(23) Furthermore, preferably, the second digital camera further includes a brightness determination unit. The brightness determination unit evaluates the brightness of the video and does not store the video when evaluating the brightness of the video to be dark.

(24) Furthermore, preferably, the brightness determination unit stores not the video but a sound portion of the video when evaluating the brightness of the video to be dark.

(25) Furthermore, preferably, the second digital camera further includes a freeze video creating unit. The freeze video creating unit creates freeze video used for reproducing the still image for a predetermined period of time. The second control unit stores a video file in which the video and the freeze video are connected in reproduction order.

(26) Furthermore, preferably, the second digital camera further includes a shooting preparation unit. The shooting preparation unit performs a shooting preparation of an automatic exposure control and/or an automatic focusing control. The first control unit performs the shooting preparation in response to an input of the first start signal and starts buffering the video after the shooting preparation.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 3A is a view explaining a folder in which a file is stored;

FIG. 3B is a view explaining a folder in which a file is stored;

FIG. 15A is a view illustrating a display screen; and

FIG. 15B is a view illustrating a display screen.

DETAILED DESCRIPTION OF THE PREFERRED EMBODIMENTS

Hereinafter, preferred embodiments of the invention will be described in detail with reference to the accompanying drawings.

[First Embodiment]

[Configuration of a First Embodiment]

Figure 1:
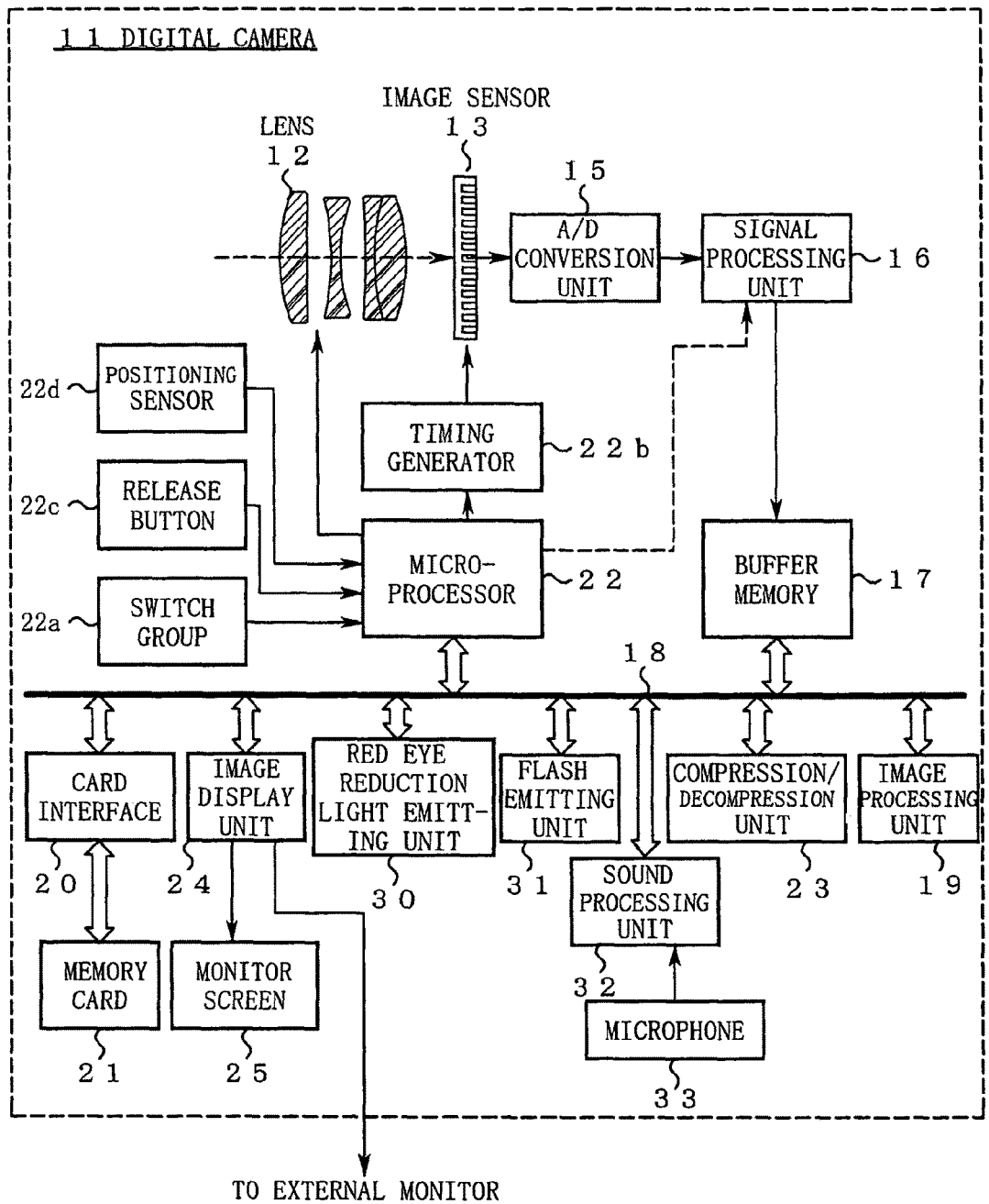
FIG. 1 is a block diagram illustrating the configuration of a first embodiment of the invention.

FIG. 1 is a block diagram illustrating the configuration of a, first embodiment of the invention.

In FIG. 1, a digital camera 11 is mounted with a lens 12. A light receiving surface of an image sensor 13 is disposed within an image space of the lens 12. An image capturing operation of the image sensor 13 is controlled by an output pulse of a timing generator 22b.

Image data outputted from the image sensor 13 is temporarily stored in a buffer memory 17 through an A/D conversion unit 15 and a signal processing unit 16.

The buffer memory 17 is connected to a bus 18. The bus 18 is connected to an image processing unit 19, a card interface 20, a microprocessor 22, a compression/decompression unit 23, an image display unit 24, a red eye reduction light emitting unit 30, a flash emitting unit 31, and a sound processing unit 32.

The card interface 20 performs data reading and writing operations with respect to a detachable memory card 21.

Further, the microprocessor 22 is input with signals from a switch group 22a, a release button 22c, and a positioning sensor 22d. The switch group 22a includes a menu button, a mode operation button, a multi-selector button, a command dial, and the like.

Furthermore, the image display unit 24 displays an image on a monitor screen 25 provided on a rear surface of the digital camera 11.

In addition, the sound processing unit 32 is connected to a microphone 33.

[Operations in the First Embodiment]

The first embodiment has the following operational features.

(1) A video is buffered by pressing the release button 22c halfway.

(2) A buffered video is deleted by releasing a half pressing operation.

(3) A video buffering operation is completed by pressing the release button 22c fully.

(4) A freeze video data is created from a still image.

(5) An image rotation processing on freeze video data is done according to the camera orientation.

(6) A merging processing on video data and freeze video data is performed.

Figure 2:
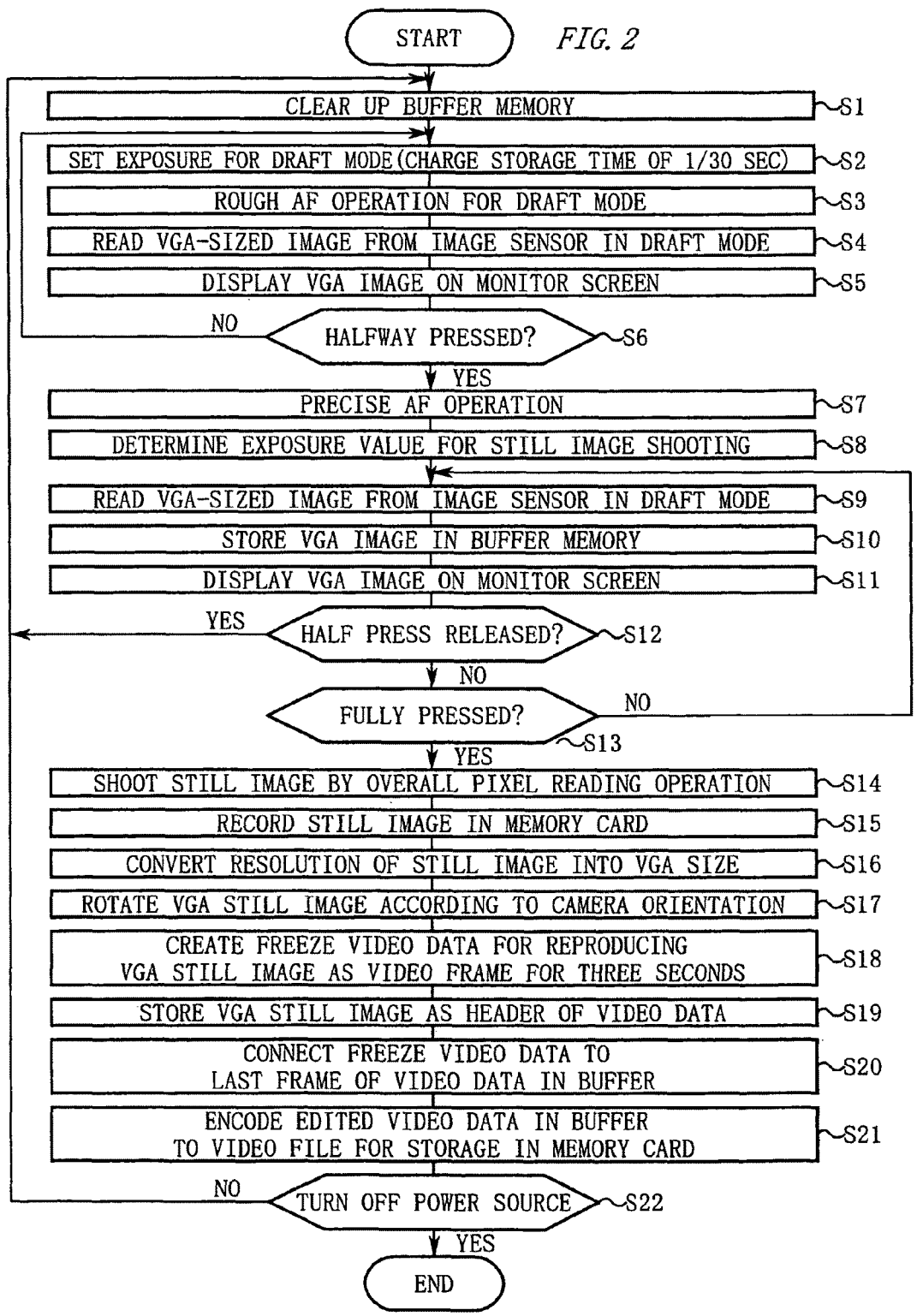
FIG. 2 is a flowchart explaining operations according to the first embodiment.

FIG. 2 is a flowchart explaining the operations described above. Hereinafter, the operations will be described in the order of reference step numbers.

First, when the main power source of the digital camera 11 is turned on, the microprocessor 22 performs a predetermined initial setting to proceed to step S1.

In step S1, the microprocessor 22 opens a memory region within the buffer memory 17. By this operation, videos that were stored in the buffer memory 17 in the past are deleted.

In step S2, the digital camera 11 displays captured images (video) on the monitor screen 25 in almost real time. In this case, in order to realize a smooth video display, the number of lines to be read out in the image sensor 13 is reduced, and thus VGA images having a high frame rate (for example, 30 frames/sec.) are continuously read out (a so-called draft mode).

The microprocessor 22 performs an exposure setting in the draft mode on the basis of a result of a side light processing (for example, signal levels of VGA images).

In step S3, the microprocessor 22 performs a focus control (for example, an AF (automatic focusing) for high contrast using VGA images) for the draft mode. Here, the microprocessor 22 performs a high-speed focusing control at a low precision in order to keep up with a composition change by a user.

In step S4, the microprocessor 22 sequentially drives the image sensor 13 through the timing generator 22b in the draft mode, thereby sequentially capturing VGA images.

In step S5, the VGA images that have been read out as described above are displayed on the monitor screen 25 by the image display unit 24.

In step S6, the microprocessor 22 monitors a half pressing operation on the release button 22c in addition to the monitor display.

Here, if the half pressing operation is not detected, the microprocessor 22 returns to step S2.

On the other hand, if the half pressing operation (input of a first start signal) is detected, the microprocessor 22 proceeds to step S7.

In step S7, corresponding to the proceeding to the half press period, the microprocessor 22 performs highly precise focusing control for shooting a still image so as to prepare for a still image shooting (pressing a release button fully).

In step S8, the microprocessor 22 determines an exposure value (iris value, charge storage time, sensitivity) for the still image shooting on the basis of the result of a side light processing (for example, signal levels of VGA images).

Further, the microprocessor 22 performs an exposure setting for a video shooting position so that the same exposure as in the still image shooting is obtained. That is, the microprocessor 22 decides the iris value such that the same exposure result as in the still image shooting is obtained in a condition in which a charge storage time for the video shooting position is ⅓₀ second. At this time, when the exposure is not sufficient even with an open iris, the insufficient exposure is supplemented by increasing the sensitivity (gain of an A/D converter 15). Meanwhile, in a case in which the exposure is excessive even with the minimum iris aperture, for example, the charge storage time is set to be reduced to ¹⁄₁₀₀ second.

In step S9, the microprocessor 22 sequentially drives the image sensor 13 through the timing generator 22$b$ in the draft mode so as to keep capturing VGA images.

In step S10, after the microprocessor 22 has completed an AF (automatic focusing) process (step S7) and an AE (automatic exposure) process (Step S8), the microprocessor 22 starts a video buffering (storing the VGA images on the buffer memory 17 as video frames) with respect to the VGA images.

Further, when the upper limit time (for example, three seconds) of the video shooting is exceeded, the microprocessor 22 sequentially deletes the video frames from the oldest one. By this operation, up-to-date video frames which do not exceed the upper limit time are maintained in the buffer memory 17.

In step S11, the image display unit 24 sequentially displays the VGA images on the monitor screen 25.

In step S12, upon a release of a half pressing operation on the release button 22$c$ during the video buffering period, the microprocessor 22 returns to step S1. In step S1, the video data buffered in the buffer memory 17 is deleted without being stored therein. After the buffered video data is deleted, the microprocessor 22 resumes an operation subsequent to step S2 before the half pressing operation.

On the other hand, if the half pressing operation on the release button 22$c$ is continued, the microprocessor 22 proceeds to step S13.

In step S13, the microprocessor 22 determines whether or not the release button 22$c$ is fully pressed.

If the full pressing operation (input of a second start signal) is detected, the microprocessor 22 proceeds to step S14.

Meanwhile, if the full pressing operation is not detected, the microprocessor 22 returns to step S9.

In step S14, the microprocessor 22 performs an exposure operation on the still image by using the exposure value for the still image shooting. As such, by setting the exposure conditions on the video shooting (step S9) and the still image shooting (step S14), it is possible to almost match the brightness of the still image with the brightness of the video.

Subsequently, the microprocessor 22 sequentially drives the image sensor 13 through the timing generator 22$b$ in an overall pixel reading mode and reads out high-resolution still images. The still images are digitized by the A/D converter 15 and are subjected to a defect pixel correction process or a gray scale correction process by the signal processing unit 16.

Then, the still images are temporarily stored in the buffer memory 17 to be subjected to an image processing such as color interpolation, color calibration, noise removal, and outline emphasis by the image processing unit 19. The compression/decompression unit 23 compresses the still images which have been subjected to the image processing.

In addition, the image processing unit 19 may perform a signal processing for red eye reduction with respect to a region where the red eye effect is detected. Moreover, the image processing unit 19 may analyze gray scales of the still images and then perform a gray scale correction process so as to make a low exposed image region bright.

As such, in particular, a still image in which pixel deterioration can be easily recognized has a high resolution by performing various image processes for only the still images. In addition, the entire processing time can be reduced by omitting an image processing for videos.

In step S15, a still image folder that stores the still images is provided in the memory card 21, as shown in FIG. 3B, and the card interface 20 stores an image-compressed still image file in one of the hierarchies of the still image folder.

In step S16, the image processing unit 19 converts the resolution of the still image stored in the buffer memory 17 into a VGA size.

In step S17, the microprocessor 22 detects the camera orientation during a still image shooting from an output of the positioning sensor 22$d$.

Figure 4:
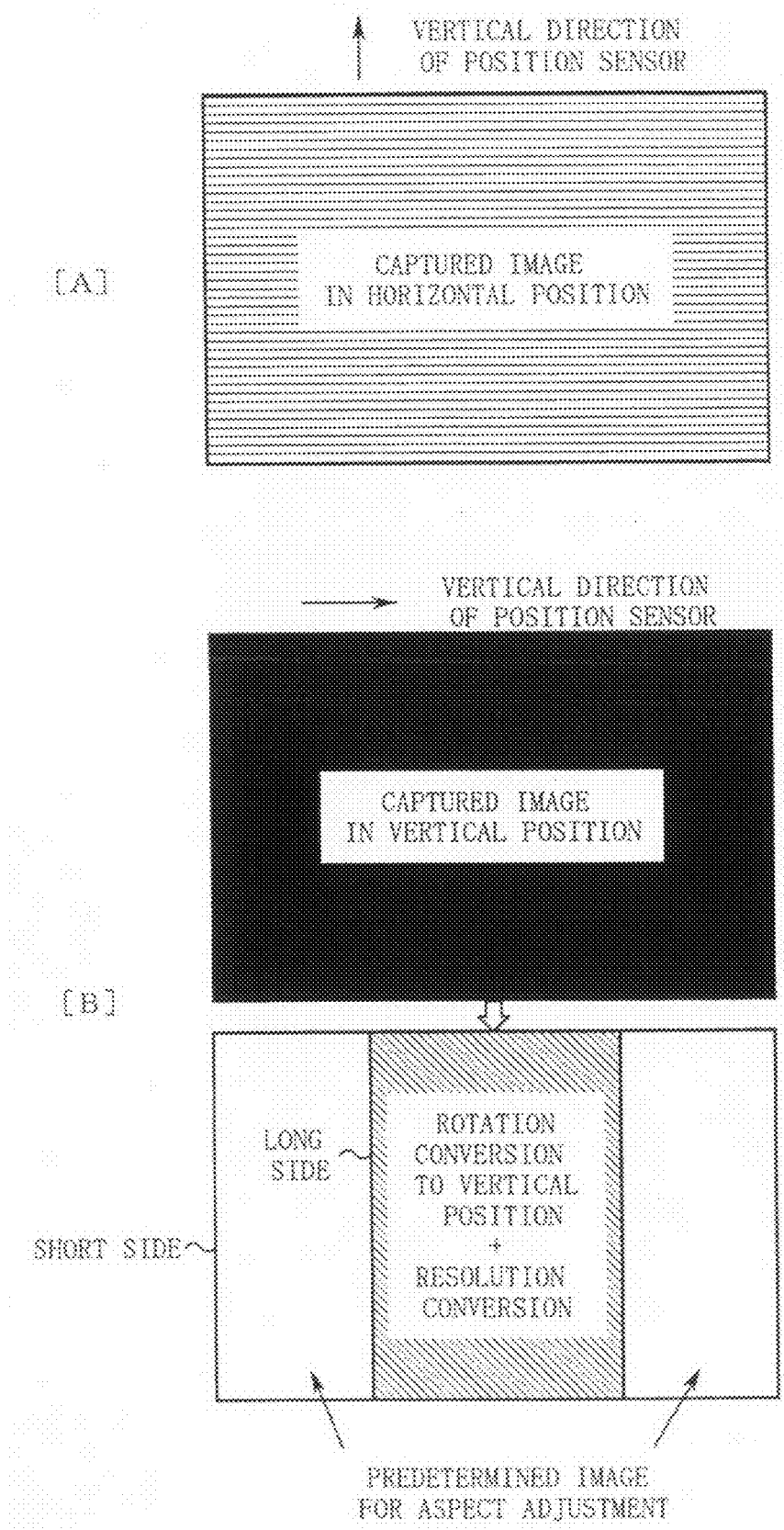
FIG. 4A is a view illustrating a rotational conversion for a VGA still image according to a shooting position.
FIG. 4B is a view illustrating a rotational conversion for a VGA still image according to a shooting position.

Here, when the still image is shot in a vertical position, the microprocessor 22 adopts the still image whose resolution has been converted into the VGA size, as shown in FIG. 4A.

On the other hand, as shown in FIG. 4B, when the still image is shot in a horizontal position, the image processing unit 19 rotates image data having a VGA size of '640 pixels in a row by 480 pixels in a column'. At this time, a resolution conversion is also performed such that a long side after the rotational conversion has the number of pixels below that of a short side before the rotational conversion, thereby obtaining image data having '360 pixels in a row by 480 pixels in a column'. Further, the image processing unit 19 adds a predetermined image (image representing a space or the like) outside a frame range of an image, which has been subjected to the rotational conversion process, so as to maintain the aspect ratio before the rotational conversion process, thereby obtaining an image having '640 pixels in a row by 480 pixels in a column'.

In step S18, the microprocessor 22 creates freeze video data, which is reproduced as video frames for three seconds, by using the VGA still images which have been subjected to the process in step S17.

For example, in the case of freeze video data following a Motion MPEG format, compressed data of the VGA still images is copied to be sequentially stored in a plurality of video frames. In addition, in the case of freeze video data following an MPEG format, compressed data of the VGA still images is copied to be stored in a plurality of I pictures, and information, which indicates that an estimation difference between frames is zero, is stored in an intermediate P or B picture.

In step S19, the microprocessor 22 stores the VGA still images as information on header of the video data in the buffer memory 17. This information is used as header information such as a thumbnail, when the image data in the buffer is encoded so as to have a predetermined video file format such as an MPEG, or the information is used as a so-called capture menu for video reproduction.

Further, for a video reproduction device (or, reproduction program), there is software showing an image of a first frame of the video as a thumbnail image. Accordingly, a VGA still image may be stored as the first frame of a video. In this case, even though the VGA still image is reproduced for a moment (for example, ⅓₀ second) at the video reproduction, it does not affects a video watching much.

Through these processes, when video data is to be used later or is reproduced in a digital camera, there is an advantage in that desired data can be easily searched. In addition, as compared with a case in which still images and videos are separately stored, it is advantageous that correlation information on both types of data items is not necessary.

In step S20, the microprocessor 22 performs an editing process such that the freeze video data created in step S18 is connected to a last frame of the video data in the buffer memory 17.

In step S21, the compression/decompression unit 23 performs encoding processes, such as motion JPEG, MPEG2, MPEG4, H264, or the like, for the edited video data in the buffer memory 17, thereby creating a video file. As shown in FIG. 3A, a video file folder is provided in the memory card 21. The card interface 20 stores an encoded video file in one of the hierarchies of the folder.

Figure 5:
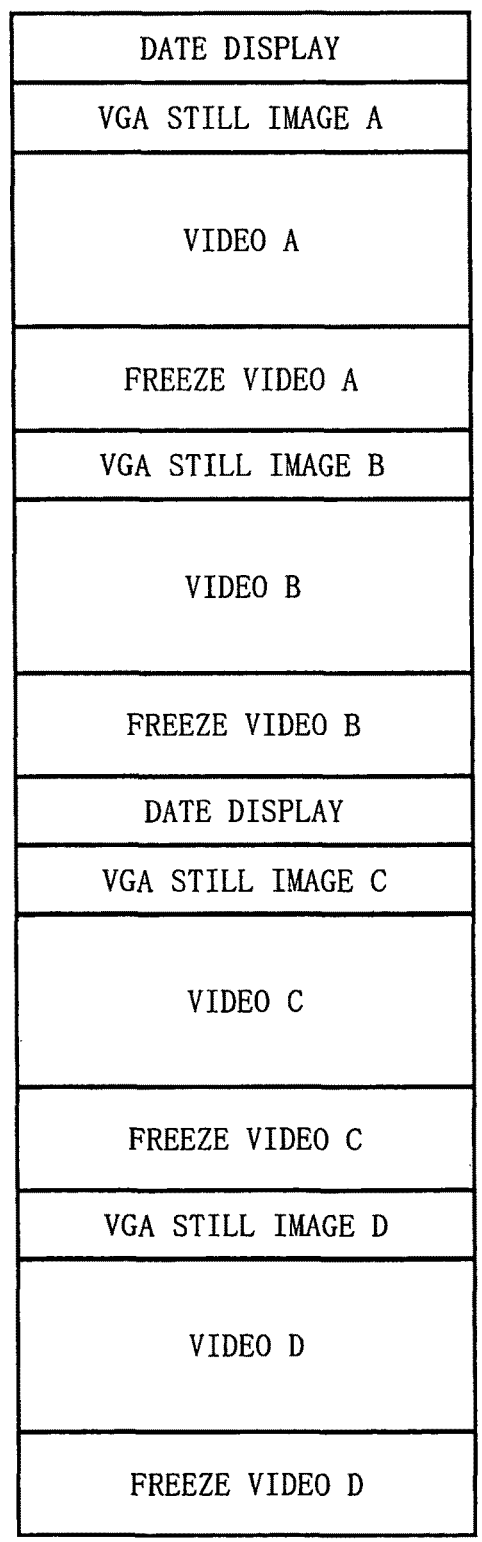
FIG. 5 is a view illustrating a file structure in which video files are connected to one another.

Further, as shown in FIG. 5, the microprocessor 22 may create a video file in the memory card 21, the video file including a series of edited video data items. The video file is created by sequentially connecting the video files, which were stored in the memory card 21 in the past, to up-to-date video files with date display inserted between some of them.

In step S22, after the recording process has been completed, the microprocessor 22 proceeds to step S1 so as to prepare for the next shooting process. In addition, when the main power source of the digital camera 11 is turned off, the microprocessor 22 waits the recording process to be completed so as to terminate the operation.

Effects, Etc. of the First Embodiment

As describe above, in the first embodiment, the freeze video data which reproduces still images for a predetermined period of time is created. The freeze video data can be reproduced in the same manner as a typical video, even though a video-dedicated reproduction device is used.

Further, in the first embodiment, the video file is created by connecting the freeze video data to the video data before the full press operation on a release button. By reproducing the video file, it is possible to continuously reproduce the still images (freeze video) and the video data before a release button is fully pressed at once. As a result, it is not necessary to individually search a video file portion and a still image portion so as to reproduce them, thereby realizing a convenient digital camera. In addition, since the video and the still images are unified as one video file, a filing work within the memory card 21 becomes easy.

Further, since the video buffering operation is released by releasing the half pressing operation, unnecessary video data is simply discarded and it is possible to easily perform a video recording process a number of times.

Furthermore, in the first embodiment, the video buffering operation starts after AE and AF operations for the still image shooting have been completed. Accordingly, the brightness of the video data and the brightness of the freeze video data can be approximately equal to each other. As a result, when the video file is reproduced, the video can be naturally displayed without a visually recognizable brightness change at a time when the video changes to the still image or the still image changes to the video.

Furthermore, in the first embodiment, the resolution of the freeze video data is converted corresponding to the screen size (the number of vertical and horizontal pixels) of the video data in the draft mode. By performing the resolution conversion, the display resolution at a portion switching between the video data and freeze video data does not change. As a result, a smooth reproduction switch from the video to the freeze video is realized.

Furthermore, in the first embodiment, the VGA still images are rotationally converted corresponding to the shooting position and then the rotationally converted VGA still images are copied to be stored in video frames. In this case, since the VGA still images is rotationally converted only once during a recording operation, there is an advantage in that processing cost is reduced as compared with a case in which a reproduction device performs the rotational conversion for the video frames one by one.

Furthermore, in the first embodiment, in the rotational conversion, the VGA size is adjusted. Accordingly, in the reproduction device, when the display conversion for the horizontal position/vertical position is performed, a smooth reproduction switching operation from the video to the freeze video can be performed without any special aspect conversion process or without converting display resolution.

Furthermore, as shown in FIG. 5, a series of video files may be created as one file in the digital camera 11. With the video file, the video data and freeze video data can be sequentially switched to be reproduced in a general-purpose video reproduction device. For this reason, specified reproduction conditions are not required, so that it is possible to create a better general-purpose video file suitable for being transferred to an acquaintance or the like.

In addition, in the series of video files shown in FIG. 5, it is possible to display the capture menu in which VGA still images are arranged as a selection item by using the general-purpose reproduction device. By operating the capture menu, it is possible to directly access a desired image.

Next, another embodiment will be described.

[Second Embodiment]

The configuration of a second embodiment is the same as that of the first embodiment (FIG. 1), and thus explanation thereof will be omitted.

The second embodiment is characterized in that a sound or an effective image to show that the switching between video and still image displays is done (hereinafter, effective switching image) is added in addition to video data and freeze video data.

Figure 6:
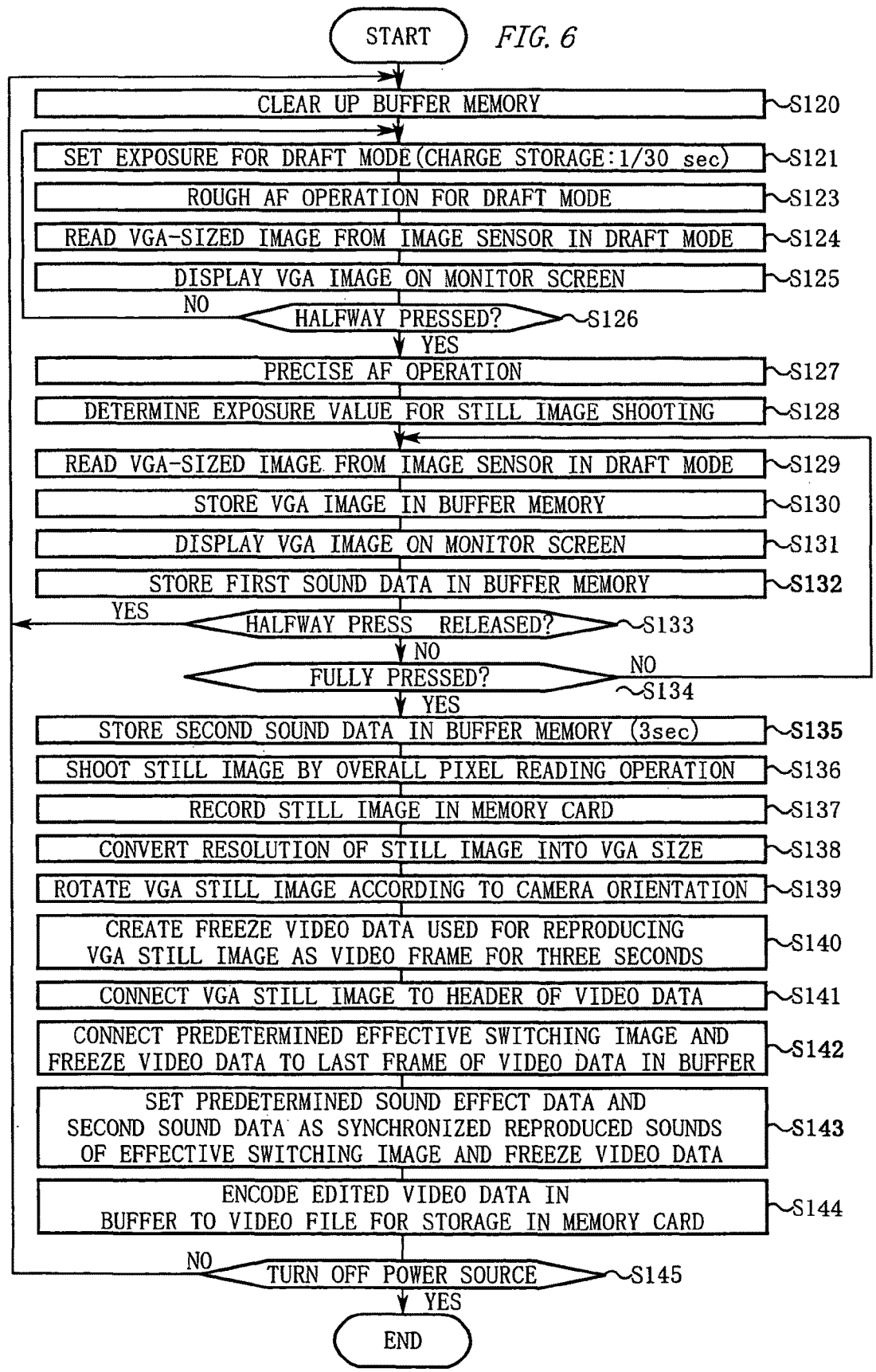
FIG. 6 is a flowchart explaining operations according to a second embodiment.

FIG. 6 is a flowchart explaining operations in the second embodiment. Hereinafter, the operations will be described in the order of reference step numbers shown in FIG. 6.

In steps S120 to S131, the same processes as in steps S1 to S11 in the first embodiment are performed.

In step S132, the sound processing unit 32 acquires sound data (hereinafter, referred to as first sound data) from the microphone 33 and stores it in the buffer memory 17, simultaneously with the video buffering, and then sets it as a synchronized reproduced sound of the video data.

In steps S133 and S134, the same processes as in steps S12 and S13 in the first embodiment are performed.

In step S135, the sound processing unit 32 acquires sound data (hereinafter, referred to as 'second sound data') from the microphone 33 for three seconds from a period of time when the release button 22c is fully pressed, and stores it in the buffer memory 17.

In steps S136 to S141, the same processes as in steps S14 to S19 in the first embodiment are performed.

In step S142, the microprocessor 22 connects a predetermined effective switching image and freeze video data to a last frame of video data in the buffer memory 17.

In step S143, the microprocessor 22 adds predetermined sound effect data and the second sound data as synchronized reproduced sounds for the effective switching image and the freeze video data, respectively.

In steps S144 and S145, the same processes as in steps S21 and S22 in the first embodiment are performed.

[Effects, Etc. of the Second Embodiment]

As described above, in the second embodiment, it is possible to obtain the same effects as in the first embodiment.

Further, in the second embodiment, the second sound data during a period of time including a period of time when still images are captured is added to the freeze video data as a synchronized reproduced sound. As a result, when the freeze video data is reproduced, a sound at a time of capturing the data can be reproduced, so that it is possible to make the freeze video data even more realistic.

Furthermore, in the second embodiment, special effects (sound effect data and effective switching image) are added at a portion switching between the video and the freeze video (still images). For example, in the digital camera 11, it is preferable to selectively add the following special effects.

(1) A sound that imitates a shutter sound
(2) An effective switching image that imitates a switching operation of a shutter
(3) A combustion sound or an explosion sound of a bulb in a case of a flash shooting for a still image
(4) An effective switching image that imitates smoke of the bulb in a case of a flash shot for a still image Further, when the synchronized reproduced sound of the freeze video data does not exist or is short, preferably, the freeze video data is reproduced in synchronization with the sound effect data in a state in which the sound effect data is set to be slightly long, thereby reinforcing impression on the freeze video data.

With the special effects, it is possible to effectively perform a switching operation from a dynamic image to a static image at a portion switching between the video data and the freeze video data.

Further, at the first and last parts of the sound data, the sound data is preferably subjected to a fade in or fade out process so that the sound does not start or stop unexpectedly.

Furthermore, the second sound data may be shortened to about one second from a full pressing operation without being matched with the reproduction time of the freeze video. In this case, there is no possibility that noise will be recorded, like in a case in which a camera is put into a bag right after the shooting.

Next, still another embodiment will be described.

[Third Embodiment]

The configuration of a third embodiment is the same as that of the first embodiment (FIG. 1), and thus explanation thereof will be omitted.

The third embodiment is characterized in that a video file in which freeze video data and video data are connected in this order is created.

Figure 7:
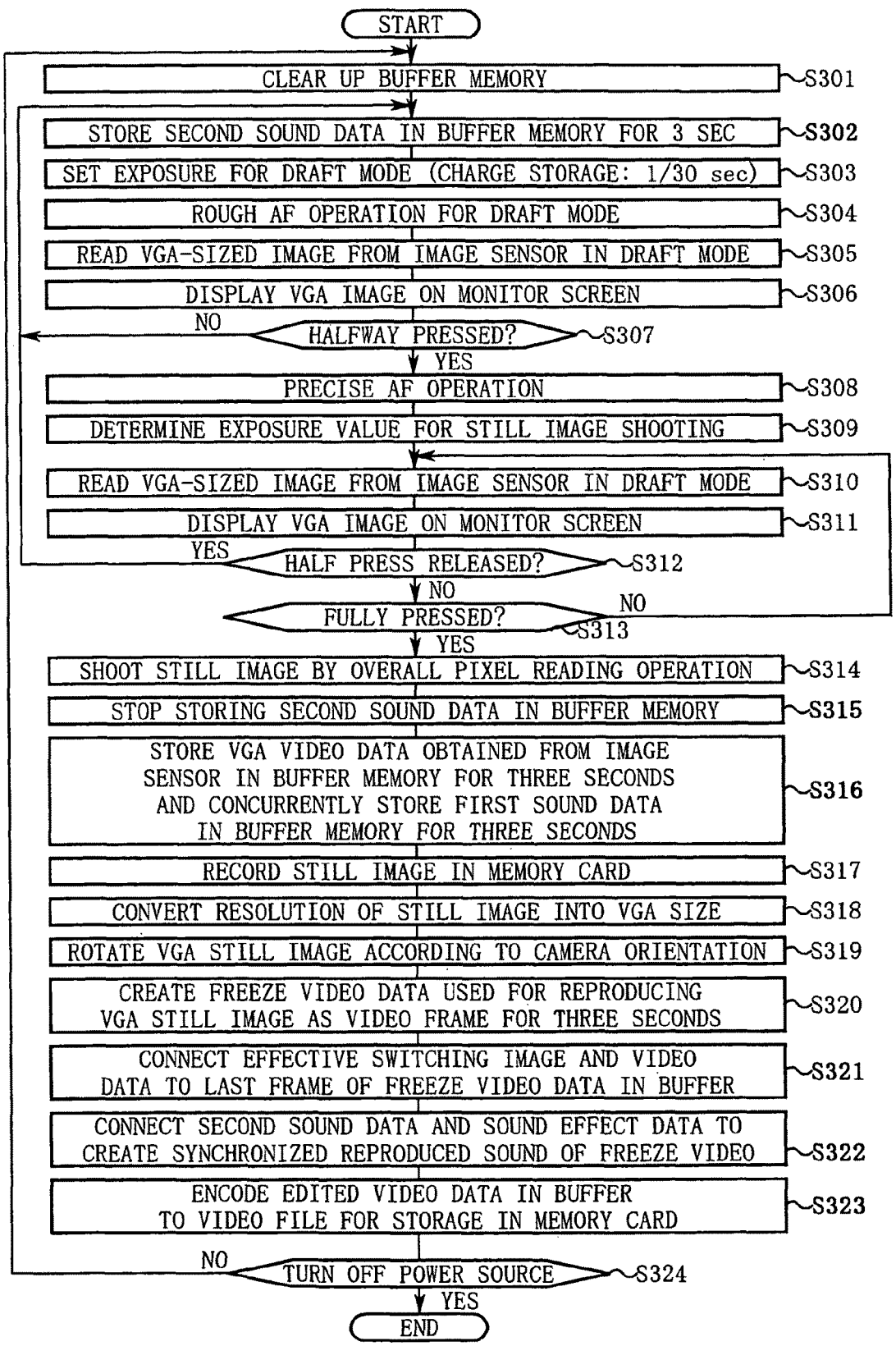
FIG. 7 is a flowchart explaining operations according to a third embodiment.

FIG. 7 is a flowchart explaining operations in the third embodiment. Hereinafter, the operations will be described in the order of reference step numbers shown in FIG. 7.

In step S301, the same process as in step S1 in the first embodiment is performed.

In step S302, before shooting a still image, the sound processing unit 32 acquires sound data (hereinafter, referred to as 'second sound data') from the microphone 33 and stores it in the buffer memory 17. The sound processing unit 32 sequentially discards past sound data exceeding three seconds among the second sound data items.

In steps S303 to S310, the same processes as in steps S2 to S9 in the first embodiment are performed.

In steps S311, the same process as in step S11 in the first embodiment is performed.

In step S312, upon a release of the half press to the release button 22c after such a half pressing operation, the microprocessor 22 returns to step S302.

On the other hand, if the half pressing operation on the release button 22c is continued, the microprocessor 22 proceeds to step S313.

In step S313, the microprocessor 22 determines whether or not the release button 22c is fully pressed.

If the full pressing operation is detected, the microprocessor 22 proceeds to step S314.

Meanwhile, if the full pressing operation is not detected, the microprocessor 22 returns to step S310.

In steps S314, the same process as in step S14 in the first embodiment is performed.

In step S315, the microprocessor 22 stops storing the second sound data.

In step S316, the microprocessor 22 sequentially drives the image sensor 13 through the timing generator 22b in the draft mode to thereby store VGA-sized video data corresponding to three seconds in the buffer memory 17. The sound processing unit 32 acquires sound data (hereinafter, referred to as 'first sound data') from the microphone 33 for the three seconds during which the video is shot and stores it in the buffer memory 17 as a synchronized reproduced sound.

In steps S317 to S320, the same processes as in steps S15 and S18 in the first embodiment are performed.

In step S321, the microprocessor 22 performs an editing process such that a predetermined effective switching image and the video data created in step S316 are connected to a last frame of the freeze video data in the buffer memory 17.

In step S322, the microprocessor 22 adds the second sound data and predetermined sound effect data as synchronized reproduced sounds for the freeze video data and the effective switching image, respectively.

In steps S323 and S324, the same processes as in steps S21 and S22 in the first embodiment are performed.

[Effects, Etc. of the Third Embodiment]

As described above, in the third embodiment, it is possible to obtain the same effects as in the first embodiment.

Further, in the third embodiment, special effects (sound effect data and effective switching image) are added at a portion switching between the video and the freeze video (still images). For example, in the digital camera 11, it is preferable to selectively add the following special effects.

(1) A sound that gives a starting sound such as 'start!'
(2) An effective switching image that imitates a switching operation of a clapperboard in making a film
(3) A combustion sound or an explosion sound of a bulb in a case of a flash shooting for a still image
(4) An effective switching image that imitates smoke of the bulb in a case of a flash shooting for a still image By using the special effects, it is possible to effectively perform a switching operation from the static image to the dynamic mode.

Next, still another embodiment will be described.

[Fourth Embodiment]

The configuration of a fourth embodiment is the same as that of the first embodiment (FIG. 1), and thus explanation thereof will be omitted.

The fourth embodiment is characterized in that a video file for automatic slide view is created by connecting a plurality of freeze video data items.

Figure 8:
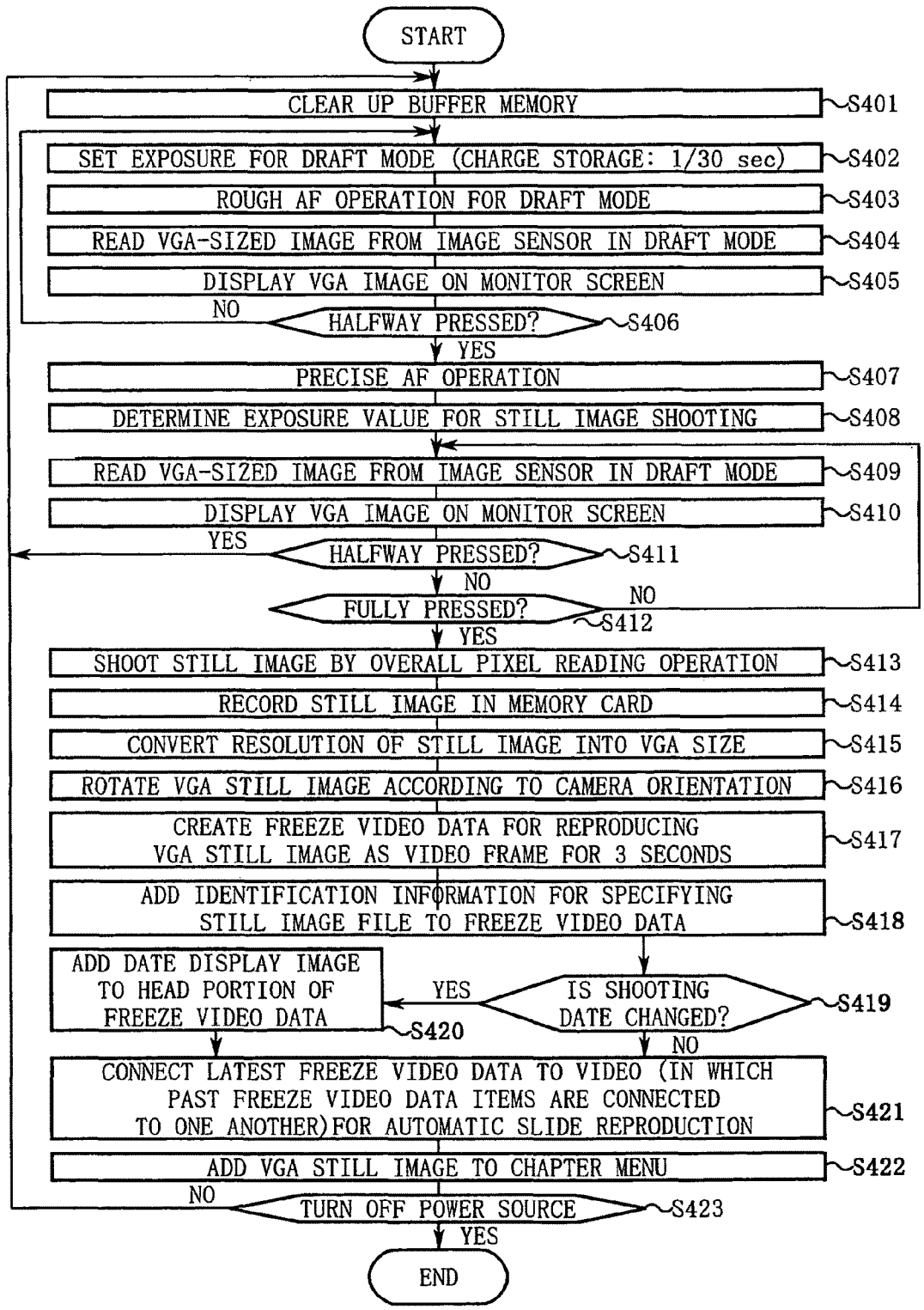
FIG. 8 is a flowchart explaining operations according to a fourth embodiment.

FIG. 8 is a flowchart explaining operations in the fourth embodiment. Hereinafter, the operations will be described in the order of reference step numbers shown in FIG. 8.

In steps S401 to S409, the same processes as in steps S1 to S9 in the first embodiment are performed.

In steps S410 to S417, the same processes as in steps S11 to S18 in the first embodiment are performed.

In step S418, the microprocessor 22 adds identification information for specifying an original still image file to the freeze video data.

In step S419, the microprocessor 22 compares a shooting date of a previously shot still image file with a shooting date of an up-to-date still image file.

If the shooting dates of the files are different from each other, the microprocessor 22 determines that there is a change of a shooting date to proceed to step S420.

On the other hand, if the shooting dates of the files are equal to each other, the microprocessor 22 proceeds to step S421.

In step S420, the microprocessor 22 creates an image including date information displayed thereon and adds it as a first frame of the freeze video data.

In step S421, the microprocessor 22 performs an editing process such that the up-to-date freeze video data is connected to the video file (in which the past freeze video data items are connected to one another) for automatic slide view stored in the memory card 21.

In step S422, the microprocessor 22 adds the VGA still image created in step S416 as a capture menu of the video file for the automatic slide view.

In step S423, after the recording process has been completed, the microprocessor 22 proceeds to step S401 so as to prepare for the next shooting process. In addition, when the main power source of the digital camera 11 is turned off, the microprocessor 22 waits the recording process to be completed so as to terminate the operation.

[Effects, Etc. of the Fourth Embodiment]

As described above, in the fourth embodiment, the video file in which the freeze video data items are connected to one another is created. By reproducing the video file in a reproduction device in the same manner as the typical video, it is possible to reliably and easily perform the automatic slide reproduction.

Further, in the fourth embodiment, the VGA still image is added as a capture menu of the video file for the automatic slide view. Thereby, a user can select a desired VGA still image by using a chapter menu function of the reproduction device. As a result, it is possible to start the automatic slide reproduction from the desired freeze video data.

Furthermore, in the fourth embodiment, only a VGA still image with a different date from that of an immediately preceding still image may be added as the capture menu. In this case, it is possible to start the automatic slide reproduction from an image corresponding to a desired shooting date by using the chapter menu function of the reproduction device.

Furthermore, in the fourth embodiment, a date is added to a portion at which the shooting dates of the video files change. As a result, it is possible to see where the shooting date changes by the date display during the automatic slide reproduction.

Furthermore, in the fourth embodiment, the identification information for specifying a still image file from which the freeze video data is created is stored for each of the freeze video data items in the video file. Therefore, by using a function of a reproduction device, it is possible to easily realize a function of, for example, switching to high-resolution display of the still image file according to the identification information during the automatic slide reproduction. Next, still another embodiment will be described.

[Fifth Embodiment]

The configuration of a fifth embodiment is the same as that of the first embodiment (FIG. 1), and thus explanation thereof will be omitted.

The fifth embodiment is characterized in that a video buffering operation is performed when framing of the digital camera 11 is determined to be stable.

Figure 9:
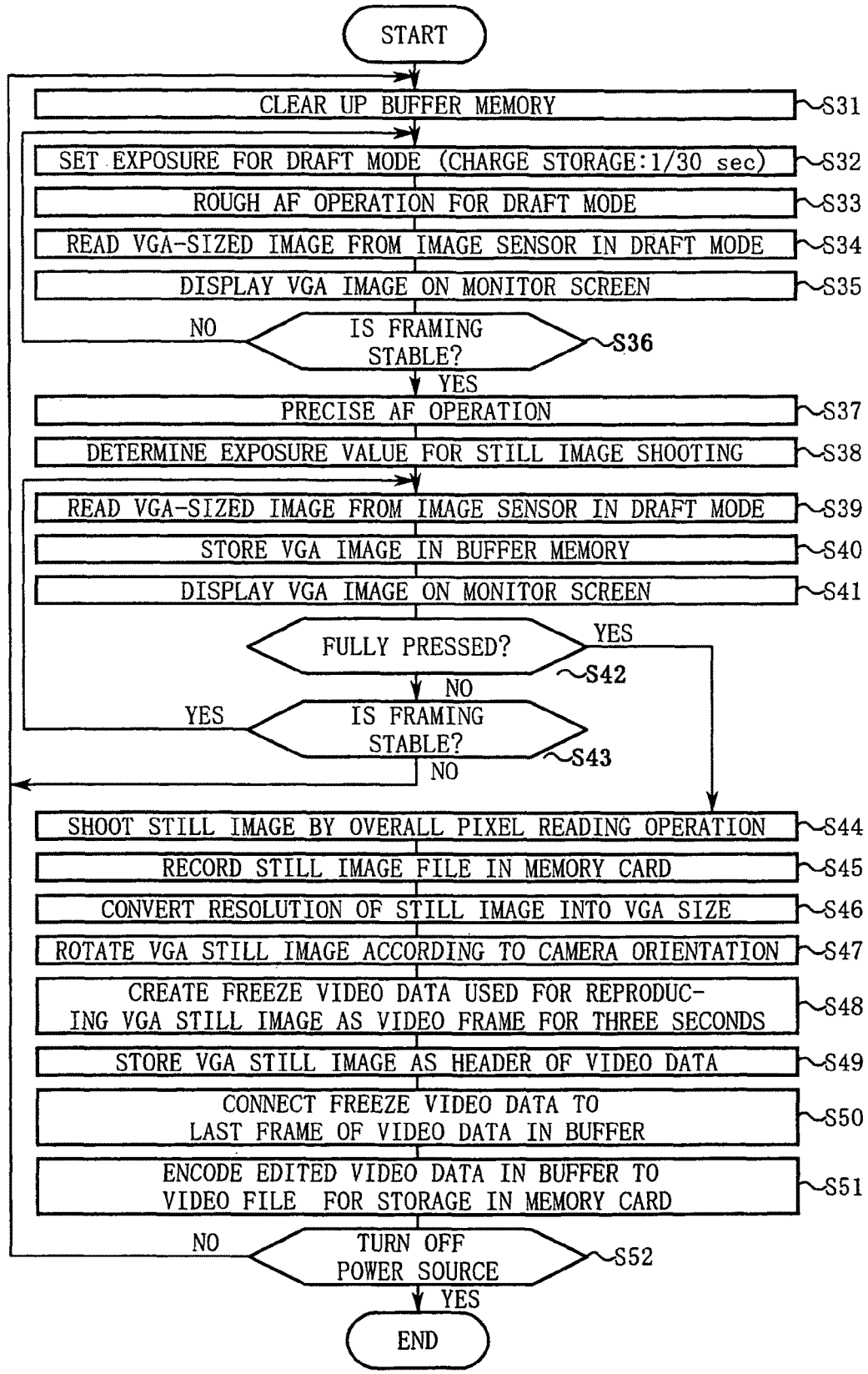
FIG. 9 is a flowchart explaining operations according to a fifth embodiment.

FIG. 9 is a flowchart explaining operations in the fifth embodiment. Hereinafter, the operations will be described in the order of reference step numbers shown in FIG. 9.

In steps S31 to S35, the same processes as in steps S1 to S5 in the first embodiment are performed.

In step S36, the microprocessor 22 obtains pixel differences between frames of the VGA image and then obtains a total sum with respect to the absolute values of the pixel differences.

If the total sum is less than a threshold value, the microprocessor 22 determines that the framing is stable (input of a first start signal), proceeding to step S37.

On the other hand, if the total sum is more than the threshold value, the microprocessor 22 determines that the framing is unstable, returning to step S32.

In addition, for the determination of the framing stability, a VGA image may be divided into, for example, 255 blocks, so as to obtain the average brightness for each block, and then the framing stability may be determined from the variation of the average brightness between frames. Alternatively, when a face of a photographic subject is detected by a known face recognition technique, the framing stability may be determined from a movement of the face of the photographic subject and a size change thereof.

In steps S37 to S41, the same processes as in steps S7 to S11 in the first embodiment are performed.

In step S42, the microprocessor 22 determines whether or not the release button 22c has been fully pressed.

If the full pressing operation is detected, the microprocessor 22 proceeds to step S44.

Meanwhile, if the full pressing operation is not detected, the microprocessor 22 returns to step S43 so as to continue the video buffering operation.

In step S43, the microprocessor 22 continues to determine the framing stability even when the video buffering operation is performed.

As a result, when the framing is determined to be stable, the microprocessor 22 returns to step S39 so as to continue the video buffering operation.

On the other hand, if the framing is determined to be unstable (cancellation of the first start signal), the microprocessor 22 returns to step S31. In this case, the video data buffered in the buffer memory 17 is deleted without being stored therein. After the buffered video data is deleted, the microprocessor 22 resumes an operation subsequent to step S32.

In steps S44 to S52, the same processes as in steps S14 to S22 in the first embodiment are performed.

[Effects, Etc. of the Fifth Embodiment]

As describe above, in the fifth embodiment, the video buffering operation starts when the framing is determined to be stable, and when the framing is determined to be unstable, the buffered video is deleted without being stored therein. By using such a function, even though a user is poor at the half pressing operation on the release button 22c, it is possible to easily start and cancel the video buffering operation.

Further, in the fifth embodiment, the video buffering operation may be performed only in a condition that the release button is halfway pressed and the framing is stable.

Furthermore, in the fifth embodiment, even though the movement of the photographic subject causes the video capturing operation to start, however, with a digital camera (for example, a mobile camera phone) added with an illumination function, the video capturing operation may start in conjunction with an ON operation of the illumination function.

Next, still another embodiment will be described.

[Sixth Embodiment]

The configuration of a sixth embodiment is the same as that of the first embodiment (FIG. 1), and thus explanation thereof will be omitted.

The sixth embodiment is characterized in that the video buffering operation is performed by using a self-timer.

Figure 10:
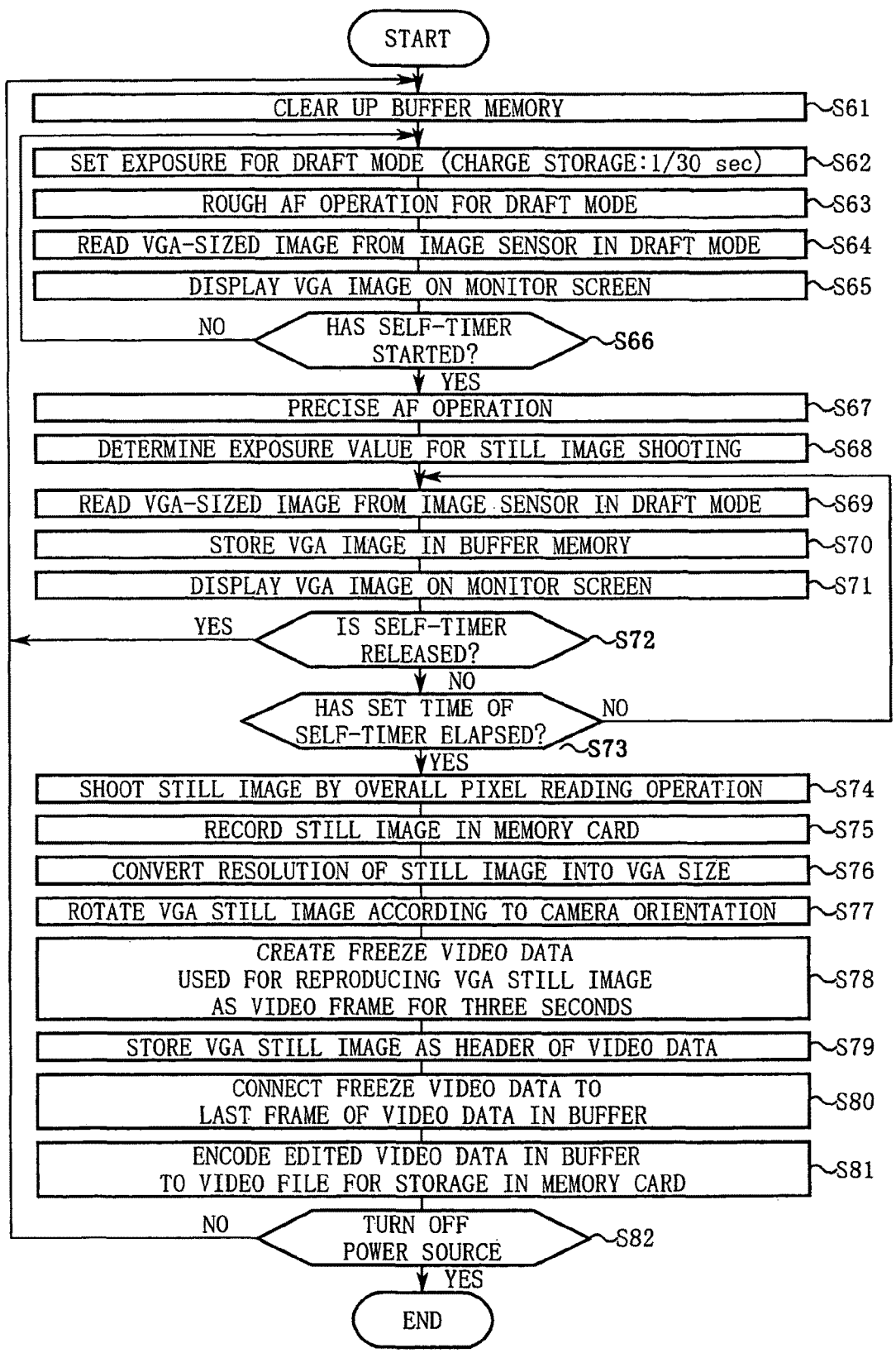
FIG. 10 is a flowchart explaining operations according to a sixth embodiment.

FIG. 10 is a flowchart explaining operations in the sixth embodiment. Hereinafter, the operations will be described in the order of reference step numbers shown in FIG. 10.

In steps S61 to S65, the same processes as in steps S1 to S5 in the first embodiment are performed.

In step S66, when the release button 22c is pressed under a state in which the switch group 22a is set in a self-timer mode, the microprocessor 22 determines that the self-timer has started to work.

As such, when it is detected (input of the first start signal) that the self-timer has started to work, the microprocessor 22 proceeds to step S67.

On the other hand, if it is not detected that the self-timer does not work, the microprocessor 22 returns to step S62.

In steps S67 to S71, the same processes as in steps S7 to S11 in the first embodiment are performed.

In step S72, when the switch group 22a is set in a mode other than the self-timer mode, the microprocessor 22 determines that the self-timer does not work.

On the other hand, if the self-timer does not work (cancellation of the first start signal), the microprocessor 22 returns to step S61. In this case, the video data buffered in the buffer memory 17 is deleted without being stored therein. After the buffered video data is deleted, the microprocessor 22 resumes an operation subsequent to step S62.

Meanwhile, when the self-timer keeps working, the microprocessor 22 proceeds to step S73.

In step S73, the microprocessor 22 determines whether or not the setting time of the self-timer has elapsed.

If the setting time of the self-timer has elapsed (input of the second start signal), the microprocessor 22 proceeds to step S74.

On the other hand, if the setting time of the self-timer has not elapsed, the microprocessor 22 proceeds to step S69 so as to keep buffering during the self-timer period.

In steps S74 to S82, the same processes as in steps S14 to S22 in the fourth embodiment are performed.

[Effects, Etc. of the Sixth Embodiment]

As describe above, in the sixth embodiment, the video buffering operation is performed while the self-timer works. In this case, immediately before a still image shooting by the self-timer, it is possible to record various scenes happening in front of a digital camera as a video. Further, since the buffered video is deleted at the same time with the cancellation of the self-timer, it is preventable of accumulation of unnecessary videos in the memory card 21.

Next, still another embodiment will be described.

[Seventh Embodiment]

The configuration of a seventh embodiment is the same as that of the first embodiment (FIG. 1), and thus explanation thereof will be omitted.

The seventh embodiment is characterized in that a video recording operation is controlled depending on the brightness of a photographic subject.

Figure 11:
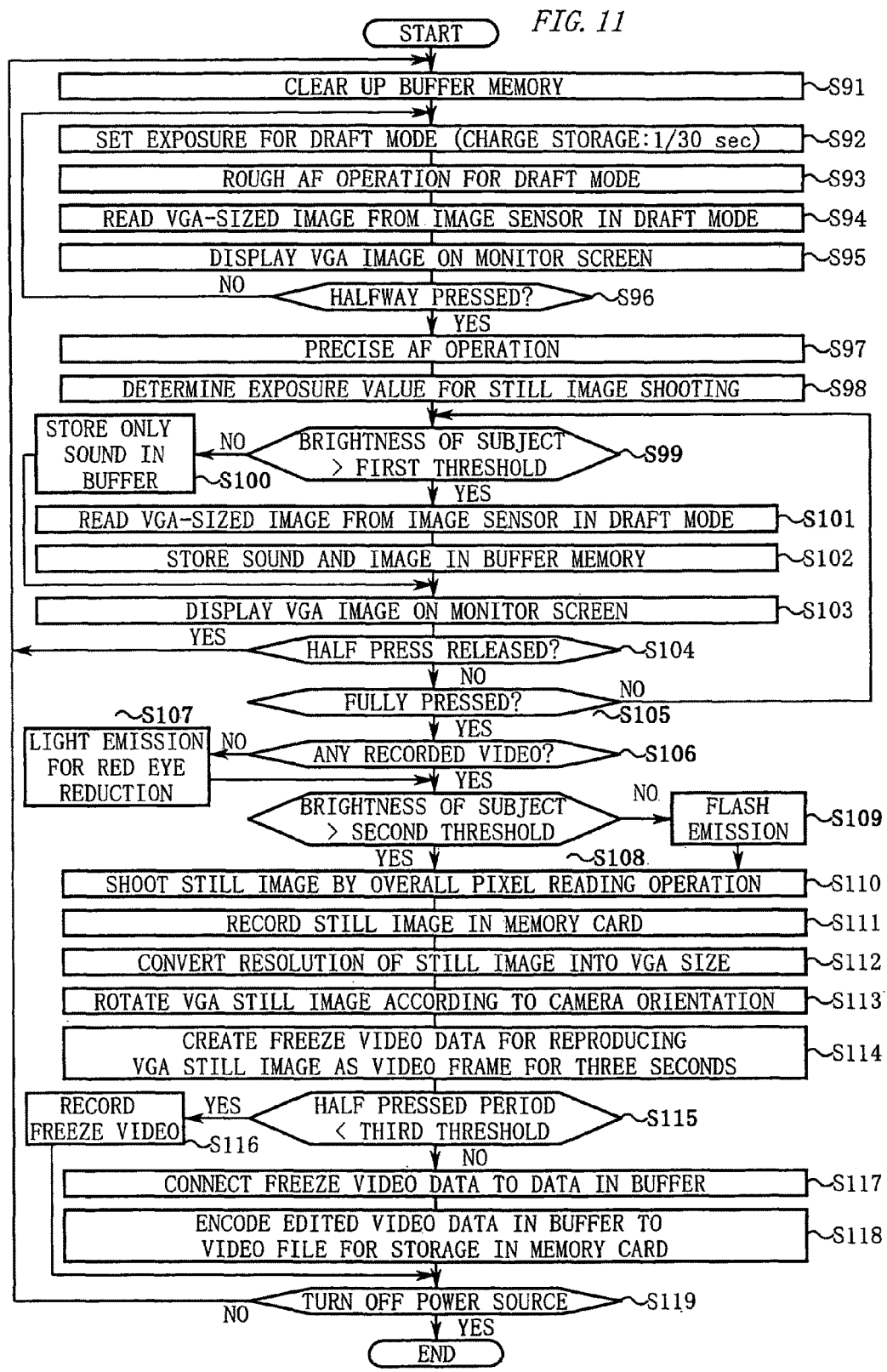
FIG. 11 is a flowchart explaining operations according to a seventh embodiment.

FIG. 11 is a flowchart explaining operations in the seventh embodiment. Hereinafter, the operations will be described in the order of reference step numbers shown in FIG. 11.

In steps S91 to S98, the same processes as in steps S1 to S8 in the first embodiment are performed.

In step S99, the microprocessor 22 determines whether or not the brightness of a VGA image (that is, the brightness of a photographic subject) is higher than a first threshold value. The first threshold value is for determining whether or not the brightness of the photographic subject is suitable for a video shooting.

If the brightness of the photographic subject is higher than the first threshold value, the microprocessor 22 determines that the brightness of the photographic subject is suitable for the video shooting, proceeding to step S101.

On the other hand, if the brightness of the photographic subject is lower than the first threshold value, the microprocessor 22 determines that the brightness of the photographic subject is not suitable for the video shooting, proceeding to step S100.

In step S100, the microprocessor 22 stores only sound data acquired from the sound processing unit 32 in the buffer memory 17. Then, the microprocessor 22 proceeds to step S103.

In step S101, the microprocessor 22 sequentially drives the image sensor 13 through the timing generator 22b in the draft mode to thereby keep shooting VGA images.

In step S102, the microprocessor 22 sequentially stores the VGA images and the sound data in the buffer memory 17.

In step S103, the image display unit 24 sequentially displays the VGA images on the monitor screen 25.

In step S104, if a half pressing operation on the release button 22c is released during the video buffering operation, the microprocessor 22 returns to step S91. Thereby, the buffered video is deleted without being stored by returning to the step S91. After the buffered video is deleted, the microprocessor 22 resumes an operation subsequent to step S92.

On the other hand, if the half pressing operation on the release button 22c is continued, the microprocessor 22 proceeds to step S105.

In step S105, the microprocessor 22 determines whether or not the release button 22c has been fully pressed.

If the full pressing operation is detected, the microprocessor 22 proceeds to step S106.

On the other hand, if the full pressing operation is not detected, the microprocessor 22 returns to step S99.

In step S106, if there is no buffered video in the buffer memory 17, the microprocessor 22 proceeds to pre-emission for reducing a red eye effect in step S107. Meanwhile, if the buffered video is in the buffering memory 17, it proceeds to step S108 without the pre-emission for reducing the red eye effect. In general, it takes about one second for the pre-emission for reducing the red eye effect. As a result, with the pre-emission, the time interval between the video portion and the still image portion (freeze video data) is apart, accordingly, an image will be discontinuous at a connecting point therebetween. For this reason, the pre-emission is omitted so as to prevent the image at the connection point from being discontinuous.

In step S107, the microprocessor 22 controls the flash emitting unit 31 so as to pre-emit for reducing the red eye effect.

In step S108, the microprocessor 22 determines whether or not the brightness of a photographic subject is higher than a second threshold value. The second threshold value is for determining whether or not the flash emission is necessary for the still image shooting.

If the brightness of the photographic subject is higher than the second threshold value, the microprocessor 22 determines that the flash emission operation is not necessary, proceeding to step S101.

On the other hand, if the brightness of the photographic subject is lower than the second threshold value, the microprocessor 22 determines that the flash emission operation is necessary, proceeding to step S109.

In step S109, the microprocessor 22 controls the flash emitting unit 31 so as to perform the flash emission operation in synchronization with the still image shooting operation.

In steps S110 to S114, the same processes as in steps S14 to S18 in the first embodiment are performed.

In step S115, the microprocessor 22 determines whether or not a half pressing time for the release button 22c is shorter than a third threshold value. The third threshold value is a threshold value that determines whether or not the release button 22c has been fully pressed at a stroke, or whether or not the half pressing operation has been a momentarily invalid operation.

Here, if the half pressing time is shorter than the third threshold value, the microprocessor 22 determines that the momentary video data is not valid, proceeding to step S116.

On the other hand, if the half pressing time is longer than the third threshold value, the microprocessor 22 determines that the video data is valid, proceeding to step S117.

Further, according to the minimum reproduction time of a minimum unit GOP (group of pictures) of video data in the video format, it is preferable to set about 0.5 seconds as the third threshold value.

In step S116, the microprocessor 22 deletes invalid video buffered in the buffer memory 17 and stores the freeze video data in the memory card 21. Then, the microprocessor 22 proceeds to step S120.

In steps S117 to S120, the same processes as in steps S19 to S22 in the first embodiment are performed.

[Effects, Etc. of the Seventh Embodiment]

As describe above, in the seventh embodiment, if it is determined that the video buffering period is short, the video data is not stored. As a result, it is possible to easily and reasonably avoid a problem that one burst press to the release button 22c causes an accumulation of a momentary, unwanted video in a recording medium.

Further, in the seventh embodiment, even when the brightness of the photographic subject is dark, the video data is not stored. As a result, it is possible to easily and reasonably avoid a problem that a dark, undesirable video is accumulated in a recording medium.

Furthermore, the freeze video data is created from a bright still image with flash illumination. Conventionally, when video data is reproduced as freeze video, a video frame as is dark pauses and displays, so that the image has lots of noise and accordingly cannot be easily viewed. However, in the seventh embodiment, since a bright freeze video with flash illumination is displayed, it is possible to realize bright and clear still image display.

Furthermore, by switching the reproduction display from the dark video data to the bright freeze video data with the flash illumination, it is possible to perform realistic reproduction display with the flash emission.

Furthermore, in the seventh embodiment, when the brightness of the photographic subject is dark, only sound data is stored instead of the video data. As a result, even in a dark condition which is not, suitable for the video shooting, it is possible to record images realistically by means of the sound.

Next, still another embodiment will be described.

[Eighth Embodiment]

The configuration of an eighth embodiment is the same as that of the first embodiment (FIG. 1), and thus explanation thereof will be omitted.

The eighth embodiment is characterized in that typical video data is set at a relatively high compression rate by giving priority to the data size, and freeze video data is set at a compression rate lower than that of the video data by giving priority to the picture quality.

Figure 12:
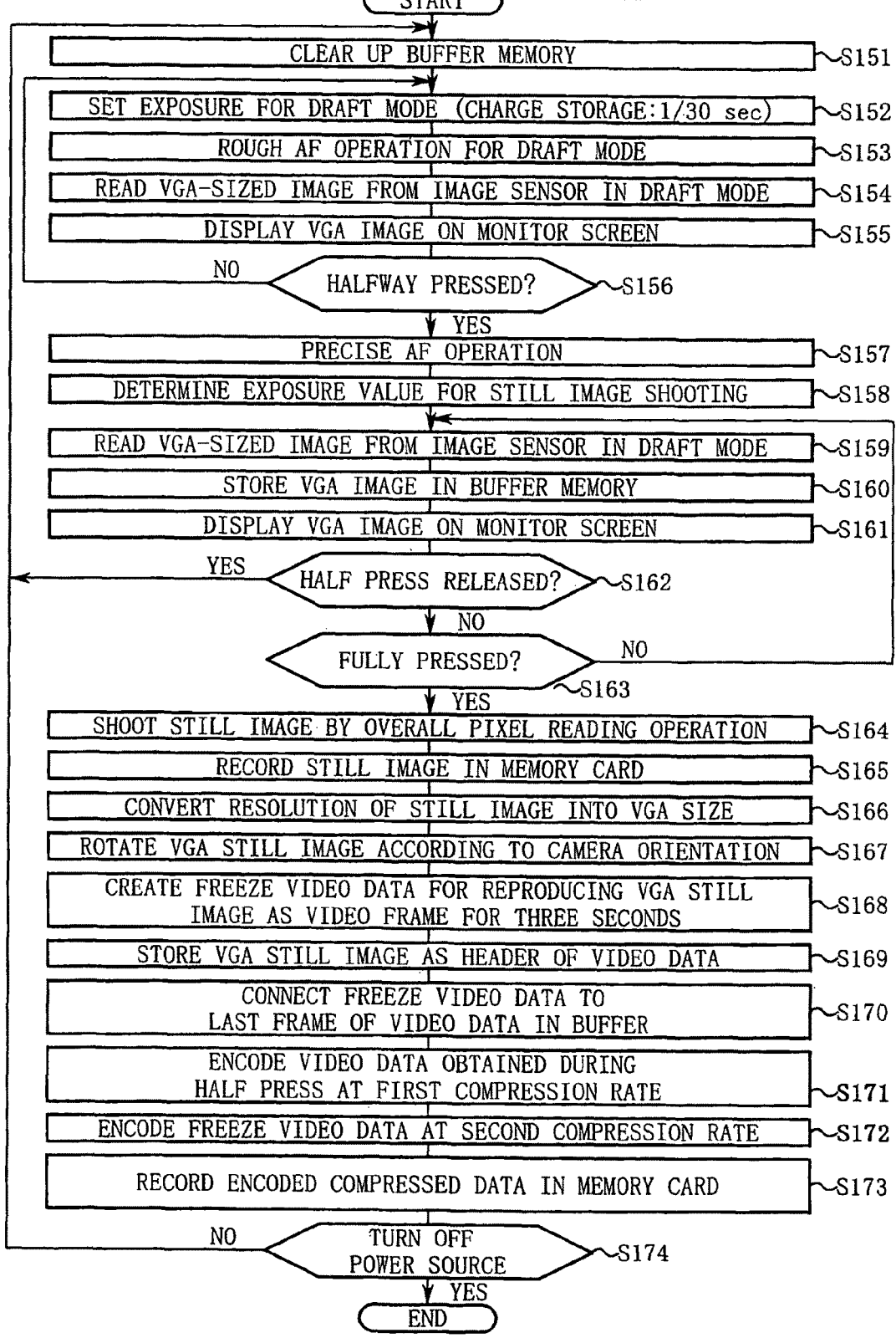
FIG. 12 is a flowchart explaining operations according to an eighth embodiment.

FIG. 12 is a flowchart explaining operations in the eighth embodiment. Hereinafter, the operations will be described in the order of reference step numbers shown in FIG. 12.

In steps S151 to S170, the same processes as in steps S1 to S20 in the first embodiment are performed.

In step S171, the compression/decompression unit 23 encodes video data stored during a half press. For example, when the video data is compressed to an MPEG2 video file, the compression/decompression unit 23 performs the encoding operation by compressing an I picture serving as a basic image at a first compression rate (high pressure). Since there is movement between the frames with regard to the video data, the deterioration of visual picture quality is reduced even when the compression rate is set high. In addition, the compressed amount of the video data is reduced.

Step S172, subsequently, the decompression unit 23 performs the encoding operation for the freeze video data. For example, in the case where the video data is compressed to an MPEG2 video file, the I picture serving as a basic image is compressed at a second compression rate (low compression rate). As a result, for the freeze video data, deterioration of visual picture quality is reduced. Further, in the case of the freeze video data, since it is possible to reduce the information amount for a B or P picture representing image variation between frames even though the compressed amount of the I picture is large, the compressed amount of the freeze video data is not greatly increased.

In step S173, the microprocessor 22 stores compressed data encoded by the compression/decompression unit 23 in the memory card 21.

In step S174, the same process as in step S22 in the first embodiment is performed.

[Effects, Etc. of the Eighth Embodiment]

As describe above, in the eighth embodiment, the same effects as in the first embodiment can be obtained.

Further, in the eighth embodiment, when the video data and the freeze video data are compressed, the compression rate switches according to features of both types of the data items. Thereby, the picture quality is not visually recognizable, and it is possible to record an image in which an overall compressed amount is suppressed to be small.

Next, still another embodiment will be described.

[Ninth Embodiment]

The configuration of a ninth embodiment is the same as that of the first embodiment (FIG. 1), and thus explanation thereof will be omitted.

The ninth embodiment is characterized in that the resolution of video data switches.

Figure 13:
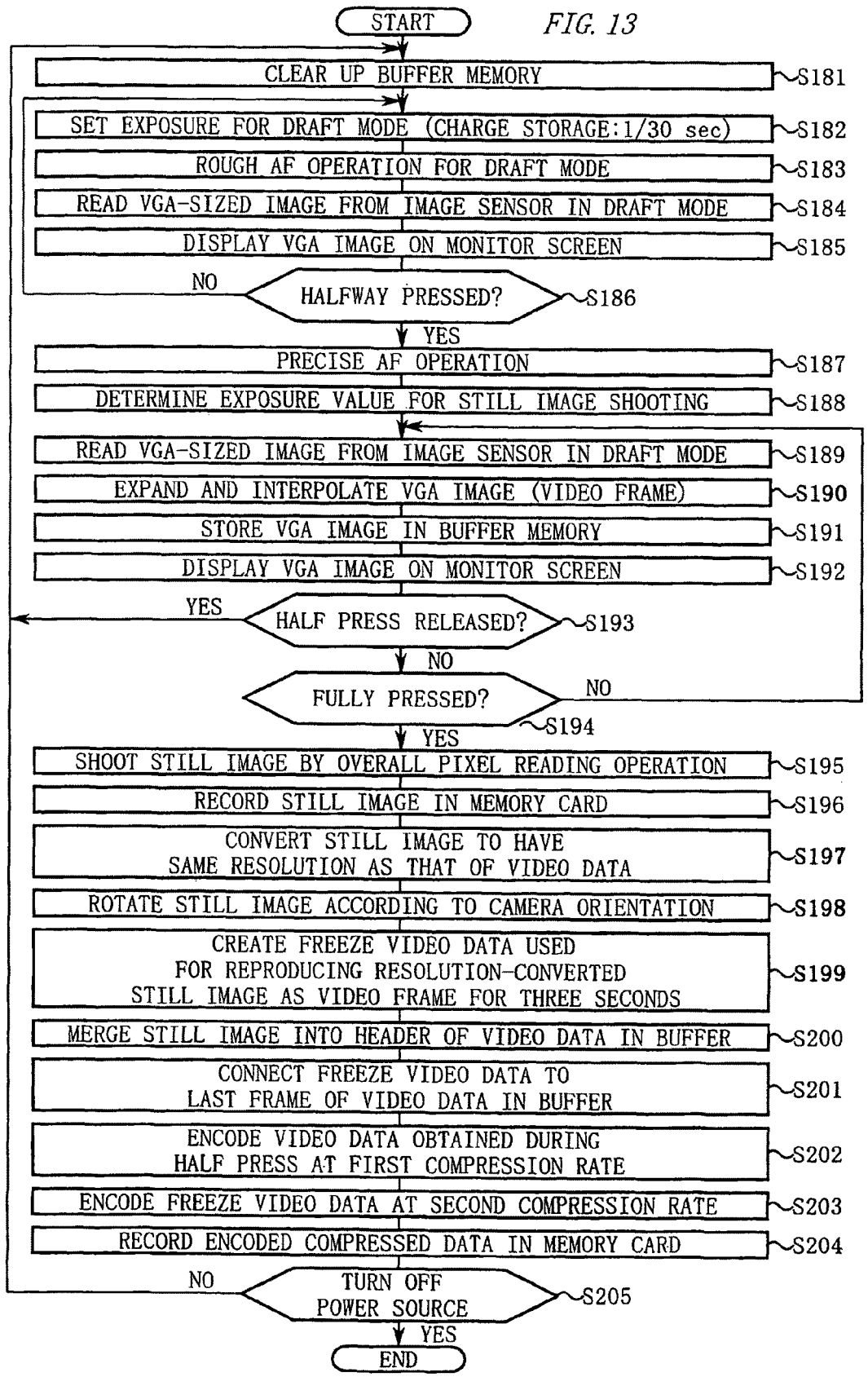
FIG. 13 is a flowchart explaining operations according to a ninth embodiment.

FIG. 13 is a flowchart explaining operations in the ninth embodiment. Hereinafter, the operations will be described in the order of reference step numbers shown in FIG. 13.

In steps S181 to S189, the same processes as in steps S1 to S9 in the first embodiment are performed.

In step S190, the image processing unit 19 enlarges a VGA image (video frame) by using a pixel interpolation, and thus the resolution of the VGA image is converted into a resolution of '960 pixels in a row by 720 pixels in a column'. After the resolution has been converted, the image has a size suitable for screen display of '1280 pixels in a row by 720 pixels in a column' which is a simple high-vision format.

In steps S191 to S196, the same processes as in steps S10 to S15 in the first embodiment are performed.

In step S197, the image processing unit 19 performs a process of reducing the resolution on the basis of still images in the buffer memory 17, thereby creating a still image (hereinafter, referred to as a simple high-vision still image) having a resolution of '960 pixels in a row by 720 pixels in a column' which is the same as that of the video data.

In step S198, when it is detected that the simple high-vision still image has been shot in the horizontal position on the basis of a detection result on the camera orientation, the image processing unit 19 performs rotational conversion, resolution conversion, and space adding processes for the simple high-vision still image.

In step S199, the microprocessor 22 creates freeze video data, which is reproduced as video frames for three seconds, by using the high-vision still image which has been subjected to the process in step S198.

In step S200, the microprocessor 22 stores the simple high-vision still image as information on the header of the video data in the buffer memory 17.

In steps S201 to S205, the same processes as in steps S170 to S174 in the eighth embodiment are performed.

[Effects, Etc. of the Ninth Embodiment]

As describe above, in the ninth embodiment, the same effects as in the first embodiment can be obtained.

Further, in the ninth embodiment, each resolution of the video data and the freeze video data is converted into a resolution of '960 pixels in a row by 720 pixels in a column', and thus it is possible to realize both video and still image displays suitable for enjoying images in a high-definition television or the like following the high-vision format.

Next, still another embodiment will be described.

[Tenth Embodiment]

The configuration of a tenth embodiment is the same as that of the first embodiment (FIG. 1), and thus explanation thereof will be omitted.

The tenth embodiment is characterized in that an image immediately before a full press is acquired from video data as so to create freeze video data.

Figure 14:
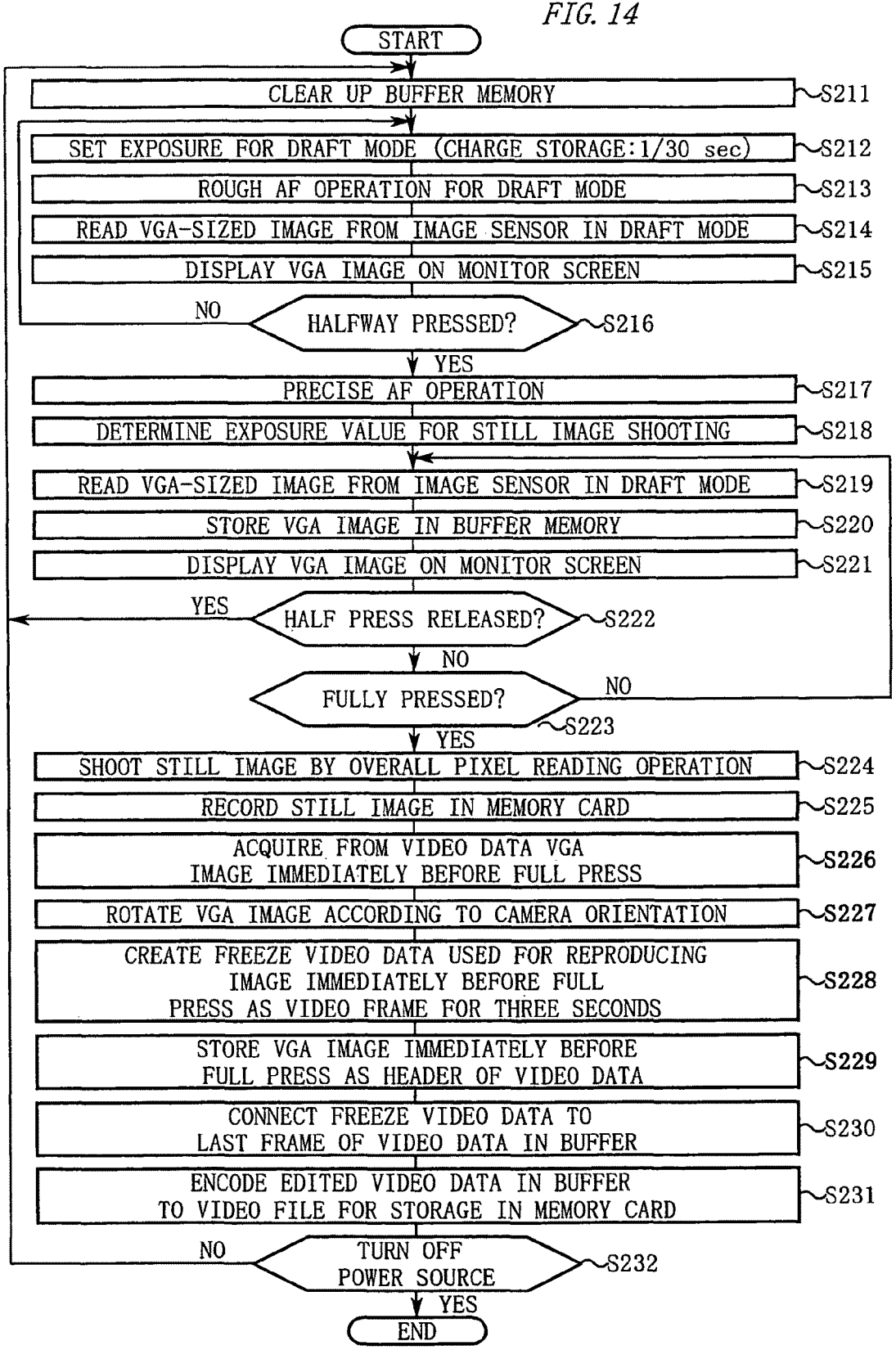
FIG. 14 is a flowchart explaining operations according to a tenth embodiment.

FIG. 14 is a flowchart explaining operations in the tenth embodiment. Hereinafter, the operations will be described in the order of reference step numbers shown in FIG. 14.

In steps S211 to S225, the same processes as in steps S1 to S15 in the first embodiment are performed.

In step S226, the microprocessor 22 reads out a VGA image immediately before a full press from a video buffered in the buffer memory 17.

In step S227, the microprocessor 22 rotationally converts the VGA image immediately before the full press, according to the camera orientation acquired from the positioning sensor 22*d*.

In step S228, the microprocessor 22 creates freeze video data, which is reproduced as video frames for three seconds, by using the VGA image which has been subjected to the process in step S227.

In step S229, the microprocessor 22 stores the VGA image immediately before the full pressing operation as information for the header of the video data in the buffer memory 17.

In steps S230 to S232, the same processes as in steps S20 to S22 in the first embodiment are performed.

[Effects, Etc. of the Tenth Embodiment]

As describe above, in the tenth embodiment, the same effects as in the first embodiment can be obtained.

Further, in the tenth embodiment, the freeze video data is created from the video data immediately before the full pressing operation. Accordingly, since it is not necessary to reduce the size of a high-resolution still image so as to create the freeze video data, there is an advantage in that processing load is low.

Next, a reproduction operation on the video file (in which the video data and freeze video data are connected to one another) created in the embodiments described above will be described.

[Example of a Reproduction Screen]

FIG. 15 is a view illustrating a display screen (including a half-tone image on a display).

The display screen is created in the image display unit 24 of the digital camera 11 and displayed on an external monitor connected to the digital camera 11. Alternatively, an external computer or a video reproduction device may fetch a file group created in the digital camera 11 through a communication medium or a recording medium to generate and display the display screen shown in FIG. 15.

Hereinafter, the display screen and an operation on the display screen will be described.

The display screen shown in FIG. 15A displays a reproduction screen 100, a thumbnail 101, operation icons 102 and 104, and a shooting date 106.

The reproduction screen 100 displays a main reproduced image, and displays a still image included in a header of the video file in a default condition.

In this state, if a user clicks on the reproduction screen 100 or a reproduction icon 105 or presses a reproduction button of the digital camera 11, a video recorded during a half press or the like is reproduced on the reproduction screen 100. Then, freeze video is displayed on the reproduction screen 100.

If the user does not operate at all, new video files are sequentially reproduced in the order of a file name or a shooting date.

On the other hand, if the user clicks on the reverse icon 102 or the scroll-up icon 104 or operates a reproduction control button (not shown) of the digital camera 11 while the reproduction screen 100 is focused and selected, still images displayed on the reproduction screen 100 are switched in the order of shooting dates.

The thumbnail 101 displays a thumbnail of a still image of a video file. Under a state in which the thumbnail 101 is focus-selected, if the reverse icon 102 or the scroll-up icon 104 is operated, it is possible to scroll a row of thumbnails 101 left and right. In this state, by clicking on the thumbnail 101 to select it, a still image selected by the clicking is displayed on the reproduction screen 100.

On the other hand, FIG. 15B is a view illustrating a book type display screen. The book type display screen displays a date 206, a reproduction screen 200, page advancing icons 202 and 204, and a reproduction icon 205 on left and right pages.

By clicking on the page advancing icons 202 and 204, first a page advancing animation and next the following new pages are displayed. On the new pages, new still images are displayed in the order of shooting dates thereof.

In this state, when the reproduction icon 205 is clicked, a video is reproduced on the left page first, and then after completion of the reproduction on the left page, a video is reproduced on the right page.

Further, at video reproduction on an external monitor connected with the digital camera 11, the video file may be reproduced by pressing the reproduction button of the digital camera 11 once and the still image may be reproduced by pressing the reproduction button of the digital camera 11 twice (double click).

[Supplement to the Embodiments]

Further, in the seventh embodiment, when the time of buffering the video data is shorter than the third threshold value, the video data is not recorded, thereby making it possible to avoid storing short, useless video data (refer to steps S115 and 5116 in FIG. 7). This function is not limited to only the seventh embodiment, but it is preferable to be also applied to the first to third embodiments and the fifth to tenth embodiments.

Furthermore, in the seventh embodiment, when the video data being buffered has a value darker than the first threshold value, the video data is not recorded, but only the sound data during the period of time is recorded (refer to steps S99 and 5100 in FIG. 7). This function is also not limited to only the seventh embodiment, but it is preferable to be also applied to the first to third embodiments and the fifth to tenth embodiments.

Furthermore, in the ninth embodiment, the video read out in the draft mode (low resolution reading mode)'s enlarged to a simple high-vision pixel size to be thus interpolated, and the still image read out in an overall pixel reading mode is reduced to the simple high-vision pixel size. This function is also not limited to only the ninth embodiment, but it is preferable to be also applied to the first to third embodiments and the fifth to tenth embodiments.

In addition, in the first to tenth embodiments described above, preferably, the following operations are performed.

(1) Strobe flash is illuminated onto only a still image.

(2) Sensitivity changes between a video and a still image. A charge storage time changes between a video and a still image.

(3) Illumination to reduce a red eye effect is not performed during a video shooting.

(4) Noise removing operation is performed for only a still image.

(5) When the recording resolution of a still image is lower than a VGA, a video is not created.

[Principles of the Embodiments]

Principles of the embodiments will be described so that the embodiments can be easily applied to a different embodiment.

(1) In the embodiments, still images are created by controlling an image capturing unit, and a video file (freeze video data) in which the still images are reproduced during a predetermined period of time is created. The freeze video data can be reproduced in the same manner as a typical video by means of a video-dedicated reproduction device. Therefore, even with the video-dedicated reproduction device, it is possible to reliably and easily reproduce still images.

(2) Further, preferably, the freeze video data is to be in a data format in compliance with predetermined video file specifications. In this case, it is possible to reliably and easily reproduce the still images by using a general-purpose video reproduction device based on the video file specifications.

(3) Furthermore, in the embodiments, preferably, the sound data during the still image shooting is added to the video data for reproducing the freeze video data in synchronization with sound. By using the freeze video data, both the still image and the sound during the still image shooting can be reproduced at the same time, which makes it possible to enjoy even more realistic still images.

(4) Furthermore, a typical video shooting may be done at a timing preceding to still image shooting so as to create video data. At this time, preferably, the preceding video data and the subsequently captured freeze video data are connected to one another to be edited in the order so that they can be organized as one file.

For the video file in which the preceding video data and the subsequently captured freeze video data are connected, correlation reproduction between the video and the still image can be implemented without a need of a link file disclosed in Japanese Unexamined Patent Application Publication No. 2002-300445.

(5) Furthermore, the typical video shooting may be done at a timing subsequent to the still image shooting so as to create the video data. At this time, preferably, the preceding still image data and the subsequently captured freeze video data are connected to one another to be edited in the order so that they can be organized as one file.

For the video file, the correlation reproduction between the video and the still image can be implemented without a need of the link file disclosed in Japanese Unexamined Patent Application Publication No. 2002-300445.

(6) Furthermore, in the embodiments, preferably, the sound effect data is added to a portion at which the freeze video data reproduction and the video data reproduction are switched. Thereby, it is possible to create a video file added with image enhancer, making visually noticeable the switching from/to a still image to/from a video during the video reproduction.

(7) Furthermore, in the embodiments, preferably, an effective switching image is inserted into a portion where the switching between the freeze video data and the video data reproduction is done. Thereby, it is possible to create a video file added with the image enhancer, such as a clear switching from the static image to the dynamic image or from the dynamic image to the static image while the video is reproduced.

(8) However, if the resolutions of the typical video data and the freeze video data are different from each other, a switch of the display resolutions frequently occurs while both the data is reproduced. As a result, a smooth switch from the video to the freeze video or from the freeze video to the video is obstructed.

Accordingly, in the embodiments, preferably, the low resolution reading operation is performed by the image capturing unit so as to create the video data, and the still image obtained by performing high resolution reading operation is resolution-converted so as to create the freeze video data. Thereby, the display resolutions of both types of the data items become close to each other, so that it is possible to avoid the switch of the display resolutions or to make it visually unrecognizable.

(9) Furthermore, it is preferable to increase, by a pixel interpolation, the number of pixels of the video data which has been read with the low resolution as well as to convert a resolution of the still image which has been read with the high resolution. Through this processing, the display resolutions of both the video data and still image approach to each other, and the change in the display resolutions is avoidable or visually unrecognizable.

(10) In the embodiments, the still image is rotationally converted according to the shooting position in the digital camera. The digital camera stores the rotationally converted still images in a video frame, thereby creating the freeze video data.

For example, in the case of a Motion PEG format, the rotationally converted still images are copied and sequentially stored in a plurality of video frames. In addition, when the estimated difference between frames is used as in the MPEG format, the rotationally converted still images are copied and stored in a plurality of I pictures, and information indicating that the estimated difference between frames is zero is stored in an intermediated P or B picture.

In such video specifications, it only has to rotationally convert the still image only once. Therefore, even with the rotational conversion in the digital camera, an increase of a processing cost falls within a negligible range.

Furthermore, the freeze video data can be reproduced in the same manner as a typical video by using a video reproduction device. In particular, the freeze video data captured in the vertical position can also be reproduced in the vertical position without performing any special operation in the video reproduction device.

(11) Further, in the embodiments, preferably, the still image is rotationally converted, such that the number of pixels of a still image in a direction of a long side of a frame is smaller than the number of pixels of the still image in a direction of a short side thereof.

In this case, the screen size (the number of vertical and horizontal pixels) after the rotational conversion is not larger than the screen size before the rotational conversion. Therefore, a still image in vertical position can be displayed in a screen adjusted to the horizontal-position screen size without expanding a vertical-position image, without performing any special operation in the video reproduction device.

(12) Furthermore, in the embodiments, preferably, a predetermined size-adjusting image is added outside a frame of the rotationally converted still image, thereby maintaining a horizontal-position screen aspect ratio.

In this case, the video reproduction device can reproduce the vertical-position image as the horizontal-position image without performing any special aspect conversion process.

(13) Furthermore, in the embodiments, the freeze video data for reproducing still images during a predetermined period of time is created and a plurality of freeze video data items are connected, thereby creating a video file.

By creating the special video file, it is possible to reliably and easily perform the automatic slide reproduction even with a video-dedicated reproduction device.

(14) Furthermore, in the embodiments, it is preferable to create an image to be displayed as one of options to reproduce and store it in a video file as a chapter menu.

Thereby, in the reproduction device, by using a function of the chapter menu, the still images can be displayed as the option. As a result, a user selects a desired still image so as to start the automatic slide reproduction from the still image.

(15) Furthermore, in the embodiments, it is preferable to create an image to be displayed as one of the options to reproduce from a still image with a different date from that of an immediately preceding still image, and store it in the video file as a chapter menu.

Thereby, in the reproduction device, by using the function of the chapter menu, the still image with a different date from that of an immediately preceding still image can be displayed as one of the options. As a result, a user selects a desired still image so as to start the automatic slide reproduction from the still image of a desired shooting date.

(16) Furthermore, in the embodiments, preferably, shooting date information is inserted in a portion where freeze video data items whose shooting dates are different are connected to one another. In this case, during the automatic slide reproduction, it is possible to see where the shooting date changes by the information display.

(17) Furthermore, in the embodiments, preferably, identification information for specifying the still image file is stored in the video file. In this case, during the automatic slide reproduction, it is possible to distinguish the still image file according to the identification information.

(18) Furthermore, in the embodiments, the digital camera starts buffering the video when the first start signal is input. In this state, if the second start signal that instructs the still image shooting is input, the video being buffered is stored.

In addition, if the first start signal is cancelled without the second start signal inputted, the digital camera does not store the video being buffered but releases it.

As such, in the operation mode, unnecessary video data can be easily discarded by releasing the first start signal. As a result, with a precise and reasonable shoot operation, it is possible to avoid a disadvantage in that unnecessary videos are stored in a recording medium.

(19) Furthermore, in the embodiments, preferably, the first start signal is output upon a press to a release button halfway, the first start signal is cancelled upon the release of the half press, and the second start signal is output upon a full press to the release button.

In this case, the video being buffered can be released by releasing the half press operation. Thereby, with a precise and reasonable shoot operation, it is possible to avoid storing unnecessary videos in a recording medium every time the half pressing operation is repeated.

(20) Furthermore, in the embodiments, the first start signal may be output if the framing is detected to be stable, and the first start signal may be cancelled if the framing is detected to be unstable.

In general, a user decides the picture composition before a still image is shot (that is, before the second signal is input) so as to make the framing stable. Since the video shooting starts in this state, it is possible to reliably video-shoot the shape of a photographic subject immediately before the still image is shot.

By using such a function, even though the user is poor at the half pressing operation on the release button, it is possible to definitely start the video buffering operation only by making the framing of a camera stable. In addition, the determination on the framing may be made by detecting oscillation of the camera or a lens or by detecting the movement of a monitor screen or the like.

(21) Further, the video buffering operation may start when a self-timer starts to work. In this case, it is possible to store, as videos, various scenes happening in front of a digital camera while the self-timer works.

(22) Furthermore, preferably, if it is determined that a transition period of time from the first start signal to the second start signal is shorter than a threshold value, the video is not stored. In this case, when the still image is shot in a hurry (for example, when the release button is fully pressed at once), the recorded video can be removed. As a result, with a precise and reasonable shooting operation, it is possible to avoid a problem that momentary, useless videos are accumulated in a recording medium.

(23) On the other hand, it is preferable to stop shooting a video or stop storing the video when the video to shoot is determined to be dark. This can eliminate storage of a dark video such as one shot in a dark place without the flash. As a result, with a precise and reasonable shooting operation, it is possible to avoid a problem that dark, useless videos are accumulated in the recording medium.

(24) Further, when it is determined that the video is dark, a sound portion of the video may be stored. In this case, it is more preferable to store the sound only when the sound level is higher than a predetermined level.

Thereby, even in a condition which is not suitable for the video shooting, it is possible to realistically record the place with the sound.

(25) Furthermore, the freeze video in which still images are reproduced for a predetermined period of time may be created. In this case, it is possible to make the video and the still image as one file by connecting the video and the freeze video in a reproduction order. In this case, by reproducing the video file reversely, it is possible to enjoy the video portion and the still image portion in the order. In addition, since the video and the freeze video are arranged as one file, a file arrangement in a recording medium becomes easy.

(26) Further, it is preferable that upon an input of the first start signal a shooting preparation is performed, and thereafter the video buffering operation starts. According to the operation sequence, it is possible to perform the video shooting at a good photographic subject image for which the shooting preparation has been completed.

The invention is not limited to the above embodiments and various modifications may be made without departing from the spirit and scope of the invention. Any improvement may be made in part or all of the components.

What is claimed is:

1. A digital camera comprising:
   an image capturing unit which captures an image of a photographic subject; and
   an image capturing control unit which controls said image capturing unit to obtain a still image and to create video data before or after said still image is captured, wherein:
   said image capturing control unit sets an exposure value of said still image based on a signal level of an image output from said image capturing unit and sets an exposure value of said video data to obtain a same exposure result as the exposure value of said still image; and
   an image processing unit which creates freeze video data having a plurality of frames, each of the plurality of frames is said still image and creates one video file in which said video data and said freeze video data are connected in a reproduction order, wherein
   said image capturing control unit creates said video data by reading pixels with a low resolution from said image capturing unit; and
   said image capturing control unit converts a resolution of said still image obtained through a high resolution reading from said image capturing unit, to create said freeze video data whose number of pixels matches with a number of pixels of said video data.

2. The digital camera of claim 1, wherein
said image processing unit creates, in a data format compliant with a predetermined video file specification, said freeze video data for reproducing said still image for a predetermined period of time.

3. The digital camera of claim 1, further comprising:
a sound collecting unit which collects a sound to create sound data; and
a sound processing unit which acquires, from said sound collecting unit, the sound data during a period of time including a point of time when said still image is captured, and then adds said sound data to said freeze video data so that said sound data is reproducible in synchronization with said freeze video data.

4. The digital camera of claim 1, further comprising:
a sound effect processing unit which adds predetermined sound effect data to said video file such that said predetermined sound effect data is reproducible in synchronization with a time when freeze video data reproduction and video data reproduction are switched.

5. The digital camera of claim 1, further comprising:
an effective image processing unit which adds to said video file a predetermined effective image to be inserted when freeze video data reproduction and video data reproduction are switched, the predetermined effective image showing that the switching between the freeze video data reproduction and the video data reproduction is done.

6. The digital camera of claim 1, wherein
said image capturing control unit increases, by a pixel interpolation, a number of pixels of said video data which is read with a low resolution from said image capturing unit.

7. The digital camera of claim 1, further comprising:
a position determination unit which determines in which shooting position, vertical or horizontal, an image is shot; and
a rotational conversion unit which rotationally converts said still image according to the shooting position to form a rotationally converted still image, wherein
said image processing unit stores the rotationally converted still image in a video frame, thereby creating freeze video data used for reproducing the rotationally converted still image for a predetermined period of time.

8. The digital camera of claim 7, wherein
when rotationally converting said still image, said rotational conversion unit converts a resolution of said still image such that a number of pixels of said still image on a long side of a frame is smaller than an other number of pixels of said still image on a short side of the frame.

9. The digital camera of claim 7, wherein
when rotationally converting said still image, said rotational conversion unit adds a predetermined image for aspect adjustment outside a frame of the rotationally converted still image to maintain an aspect ratio before rotational conversion.

10. The digital camera of claim 1, wherein
said image processing unit connects a plurality of pieces of the freeze video data to create a video file usable for an automatic slide reproduction.

11. The digital camera of claim 10, wherein
said image processing unit creates, from said still image, an image to be displayed for one of options to reproduce, and stores a created image in said video file for a chapter menu.

12. The digital camera of claim 10, wherein
said image processing unit creates, from a still image with a shooting date different from a shooting date of an immediately preceding still image, an image to be displayed for one of options to reproduce, and stores a created image in said video file for a chapter menu.

13. The digital camera of claim 10, wherein
when said plurality of pieces of the freeze video data to connect have different shooting dates, said image processing unit inserts a shooting date to a portion at which the shooting dates of the freeze video data change at reproduction.

14. The digital camera of claim 10, wherein
said image processing unit stores, in said video file, identification information specifying a still image file from which an image to be displayed is created.

* * * * *